United States Patent
Kakizawa et al.

(10) Patent No.: US 12,083,431 B2
(45) Date of Patent: *Sep. 10, 2024

(54) TERMINAL APPARATUS, CONTROL METHOD, AND CONTROL PROGRAM

(71) Applicant: GREE, Inc., Tokyo (JP)

(72) Inventors: Koji Kakizawa, Tokyo (JP); Shota Shimoda, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,456

(22) Filed: Mar. 14, 2023

(65) Prior Publication Data

US 2023/0219001 A1 Jul. 13, 2023

Related U.S. Application Data

(63) Continuation of application No. 16/658,300, filed on Oct. 21, 2019, now Pat. No. 11,628,362.

(30) Foreign Application Priority Data

Oct. 22, 2018 (JP) .................... 2018-198565
Jun. 18, 2019 (JP) .................... 2019-112873

(51) Int. Cl.
*A63F 13/56* (2014.01)
*A63F 13/2145* (2014.01)
(Continued)

(52) U.S. Cl.
CPC .......... *A63F 13/56* (2014.09); *A63F 13/2145* (2014.09); *A63F 13/25* (2014.09); *A63F 13/52* (2014.09)

(58) Field of Classification Search
CPC ...... A63F 13/56; A63F 13/2145; A63F 13/25; A63F 13/52
See application file for complete search history.

(56) References Cited

U.S. PATENT DOCUMENTS

2013/0090168 A1* 4/2013 Shikata ................. A63F 13/428
463/37
2014/0089862 A1 3/2014 Jones et al.
(Continued)

FOREIGN PATENT DOCUMENTS

| JP | 2005176878 A | 7/2005 |
| JP | 2016059554 A | 4/2016 |
| JP | 2017051493 A | 3/2017 |

OTHER PUBLICATIONS

Office Action issued on Jan. 15, 2019, in corresponding Japanese Application No. 2018-198565; 10 pgs.
(Continued)

*Primary Examiner* — Werner G Garner
(74) *Attorney, Agent, or Firm* — Maier & Maier, PLLC

(57) ABSTRACT

A terminal apparatus, which may include a display unit that displays a game content positioned in a virtual space, a storage unit that stores information related to a predetermined position in the virtual space, a retrieving unit that retrieves instructions for moving including a moving direction given by a player, a calculating unit that calculates a route from a position of the game content in the virtual space to the predetermined position, a determining unit that determines whether or not the calculated route satisfies a predetermined condition related to the moving direction, and a display control unit that controls display of the game content such that the game content moves to the predetermined position along the route when it is determined that the route satisfies the predetermined condition.

19 Claims, 13 Drawing Sheets

(51) Int. Cl.
    *A63F 13/25*     (2014.01)
    *A63F 13/52*     (2014.01)

(56) References Cited

U.S. PATENT DOCUMENTS

| | | |
|---|---|---|
| 2014/0320446 A1 | 10/2014 | Kim et al. |
| 2015/0338875 A1 | 11/2015 | Aujay |
| 2018/0001201 A1 | 1/2018 | Desjardins et al. |
| 2018/0056183 A1* | 3/2018 | Tezuka .................. A63F 13/56 |

OTHER PUBLICATIONS

"How do the characters in video games move so fluidly?", Oct. 7, 2017, HowStuffWorks, available at <<https://web.archive.org/web/20171007201513/http://electronics.howstuffworks.com/question538.htm>>. (Year: 2017).

Office Action issued on Oct. 17, 2023, in corresponding Japanese Application No. 2022-180072; 8 pgs.

KotoDamar, "Thoughts on the implementation of Momotaro Electric Railway's help function "Let's go!"", ktbdmr words silence, Hatena Blog [online], May 23, 2016, 22 pages.

* cited by examiner

1010

| AREA ID | VERTEX | ADJACENT AREA ID | ... |
|---|---|---|---|
| AREA 1 | (X1,Y1),(X2,Y2),(X3,Y3) | AREA 2, AREA 3 | ... |
| AREA 2 | (X1,Y1),(X2,Y2),(X4,Y4) | AREA 1, AREA 4 | ... |
| AREA 3 | (X1,Y1),(X3,Y3),(X5,Y5) | AREA 1, AREA 5 | ... |
| ... | ... | ... | ... |

| DESTINATION ID | POSITION | AREA ID | ... |
|---|---|---|---|
| DESTINATION 1 | (X6,Y6) | AREA 6 | ... |
| DESTINATION 2 | (X7,Y7) | AREA 7 | ... |
| DESTINATION 3 | (X8,Y8) | AREA 8 | ... |
| ... | ... | ... | ... |

TERMINAL APPARATUS, CONTROL METHOD, AND CONTROL PROGRAM

This application claims priority from U.S. patent application Ser. No. 16/658,300, filed on Oct. 21, 2019, entitled "TERMINAL APPARATUS, CONTROL METHOD, AND CONTROL PROGRAM," which claims priority from Japanese Patent Application No. 2018-198565, filed on Oct. 22, 2018, and Japanese Patent Application No. 2019-112873, filed on Jun. 18, 2019, the entire contents of each of which are hereby incorporated by reference.

FIELD

The present invention relates to a terminal apparatus, a control method, and a control program.

BACKGROUND

In the past, games in which a player operates a character positioned in a virtual space have become widespread. In such a game, the character moves in the virtual space in accordance with an operation of the player designating a moving direction. Then, the player causes the game to proceed by playing against an enemy character which the character encounters, or by capturing an occurred event.

In such a game, the player encounters an enemy character or causes an event to occur by operating the character to a predetermined destination. Then, the game progresses by visiting the destinations in a predetermined order. Patent Literature 1 discloses a movement control method of causing a character to automatically move to a destination designated by a player as a method of supporting the player's operation on the character.

Patent Literature 1, referenced above, is Japanese Patent Application JP-A-2005-176878.

SUMMARY

In the movement control method disclosed in Patent Literature 1, the player designates the destination in order to cause the character to move to the destination. However, the operation of designating the destination is not regarded as being intuitive for the player as compared with the operation of designating the moving direction and causing the character to move. Also, in the movement control method disclosed in Patent Literature 1, it is necessary for the player to know the destination in advance in order to designate the destination. However, there are cases in which the player does not have accurate knowledge of the destination such as cases in which the player has never visited the destination or knows only the direction of the destination but does not know the exact position. In these cases, the player is unable to designate the destination, and the movement control method disclosed in Patent Literature 1 is unable to support the player's operation on the character.

Exemplary embodiments described herein solve the above-mentioned problems, and it is an object of the exemplary embodiments described herein to support the player's operation on the character through an operation intuitive for the player.

In order to solve the above-mentioned problems, a terminal apparatus according to an exemplary embodiment may include a display unit that displays a game content positioned in a virtual space, a storage unit that stores information related to a predetermined position in the virtual space, a retrieving unit that retrieves instructions for moving including a moving direction given by a player, a calculating unit that calculates a route from a position of the game content in the virtual space to the predetermined position, a determining unit that determines whether or not the calculated route satisfies a predetermined condition related to the moving direction, and a display control unit that controls display of the game content such that the game content moves to the predetermined position along the route when it is determined that the route satisfies the predetermined condition.

In the terminal apparatus according to an exemplary embodiment, preferably, the route may include a plurality of elements of the route, wherein the predetermined condition may be a condition that a size of an angle formed by the moving direction and a direction of the element of the route connected to the position of the game content is a predetermined angle or less.

In the terminal apparatus according to an exemplary embodiment, preferably, the instructions for moving may include information related to an operation position, wherein the calculating unit may not calculate the route when the information related to the operation position is within a predetermined range.

In the terminal apparatus according to an exemplary embodiment, preferably, the display control unit may control the display of the game content such that the game content moves in the moving direction when it is determined that the route does not satisfy the predetermined condition.

In the terminal apparatus according to an exemplary embodiment, preferably, the display control unit may display at least a part of the route in the virtual space when it is determined that the route satisfies the predetermined condition.

In the terminal apparatus according to an exemplary embodiment, preferably, the display control unit may display information for urging the player to input the instructions for moving on the display unit when the game content moving along the route stops before reaching the predetermined position.

Preferably, the terminal apparatus according to an exemplary embodiment further may include an operating unit that detects a touch by the player, such that the retrieving unit retrieves a touch position at which the player touches the operating unit at predetermined time intervals, wherein the moving direction is a direction of the touch position between a penultimate touch position in a sequence retrieved by the retrieving unit, and a final touch position lastly retrieved by the retrieving unit and occurring at a final part of the sequence.

In the terminal apparatus according to an exemplary embodiment, preferably, the calculating unit may calculate a plurality of routes from the position of the game content and a parameter related to each of the plurality of routes.

In the terminal apparatus according to an exemplary embodiment, preferably, the display control unit may control the display of the game content such that the game content moves along a route having the smallest parameter among the routes determined to satisfy the predetermined condition when a plurality of routes are determined to satisfy the predetermined condition.

In the terminal apparatus according to an exemplary embodiment, preferably, the calculating unit may calculate a route to the predetermined position in which a relation with the position of the game content is a predetermined relation.

In order to solve the above-mentioned problems, a control method according to an exemplary embodiment may be a control method of a terminal apparatus including a storage unit and a display unit that may display a game content positioned in a virtual space and may include storing information related to a predetermined position in the virtual space in the storage unit, retrieving instructions for moving including a moving direction given by a player, calculating a route from a position of the game content in the virtual space to the predetermined position, determining whether or not the calculated route satisfies a predetermined condition related to the moving direction, and controlling display of the game content such that the game content moves to the predetermined position along the route when it is determined that the route satisfies the predetermined condition.

In order to solve the above-mentioned problems, a control program according to an exemplary embodiment may be a control program of a terminal apparatus including a storage unit and a display unit that may display a game content positioned in a virtual space, with the control program causing the terminal apparatus to execute storing information related to a predetermined position in the virtual space in the storage unit, retrieving instructions for moving including a moving direction given by a player, calculating a route from a position of the game content in the virtual space to the predetermined position, determining whether or not the calculated route satisfies a predetermined condition related to the moving direction, and controlling display of the game content such that the game content moves to the predetermined position along the route when it is determined that the route satisfies the predetermined condition.

With the terminal apparatus, the control method, and the control program according to an exemplary embodiment, it may be possible to support the player's operation on the character through the operation intuitive for the player.

BRIEF DESCRIPTION OF THE DRAWINGS

FIG. 10A is a diagram illustrating an exemplary embodiment of a data structure of an area table 1010;

FIG. 10B is a diagram illustrating an exemplary embodiment of a data structure of a destination table 1020;

DETAILED DESCRIPTION

Hereinafter, various exemplary embodiments will be described with reference to the appended drawings. However, it should be noted that the technical scope of the invention may not be limited to those implementations and may include any exemplary embodiments described in claims set forth below and equivalents thereof.

Figure 1:
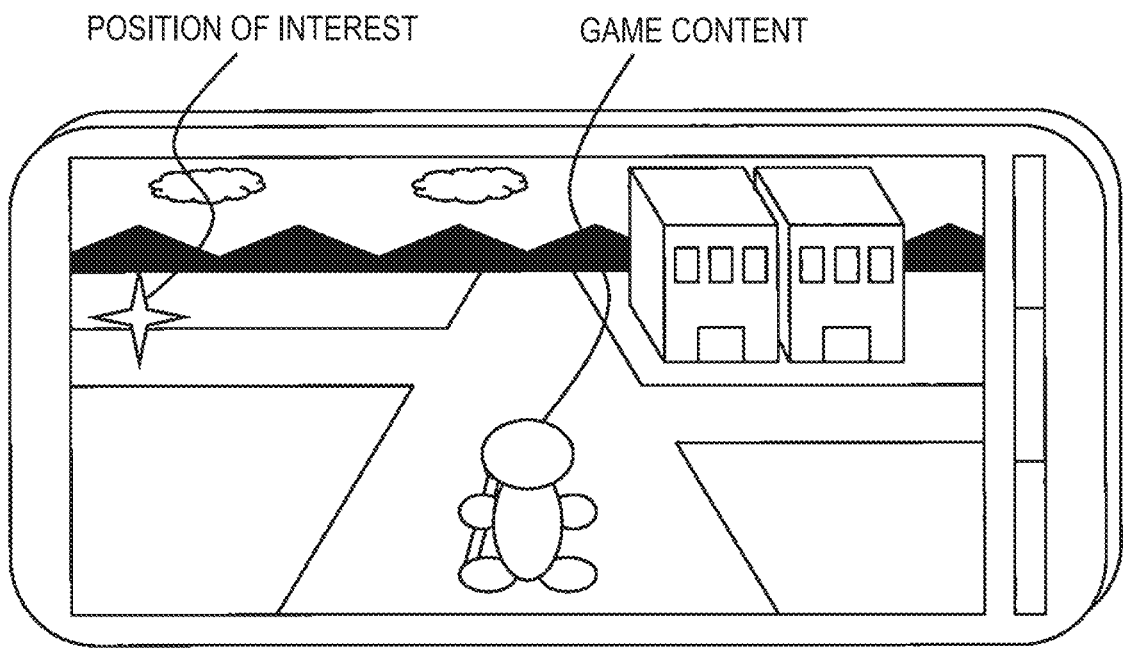
FIG. 1 is a schematic diagram for describing an overview of an exemplary embodiment of a game provided by a terminal apparatus.
Figure 1:
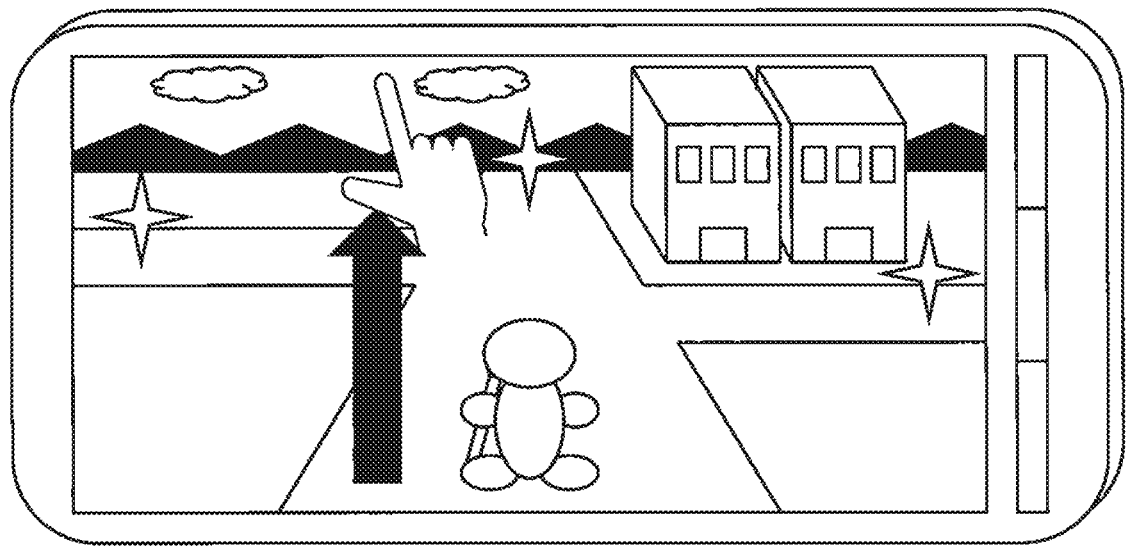
Figure 2:
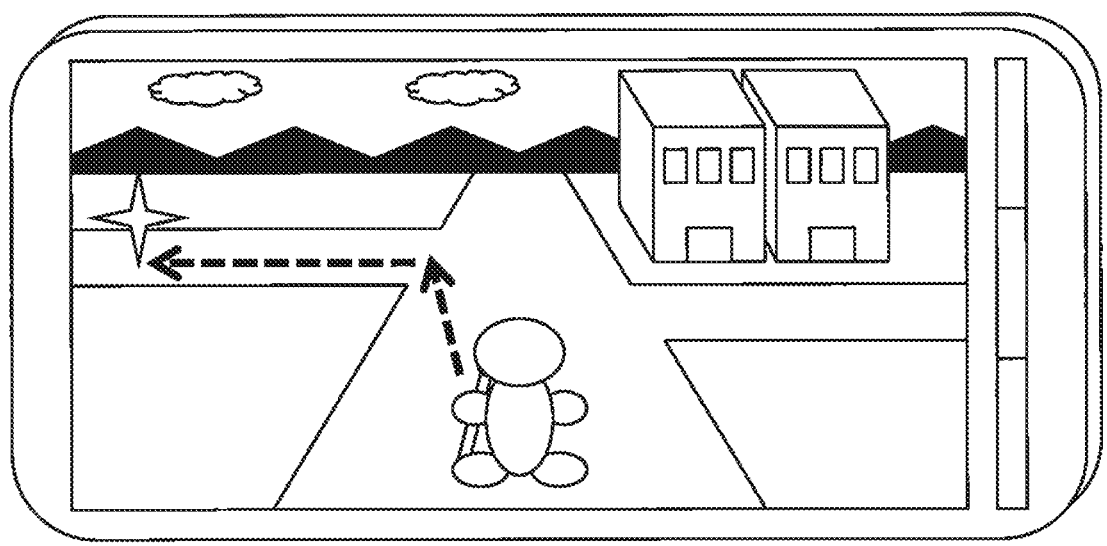
FIG. 2 is a schematic diagram for describing an overview of an exemplary embodiment of a game provided by a terminal apparatus.
Figure 2:
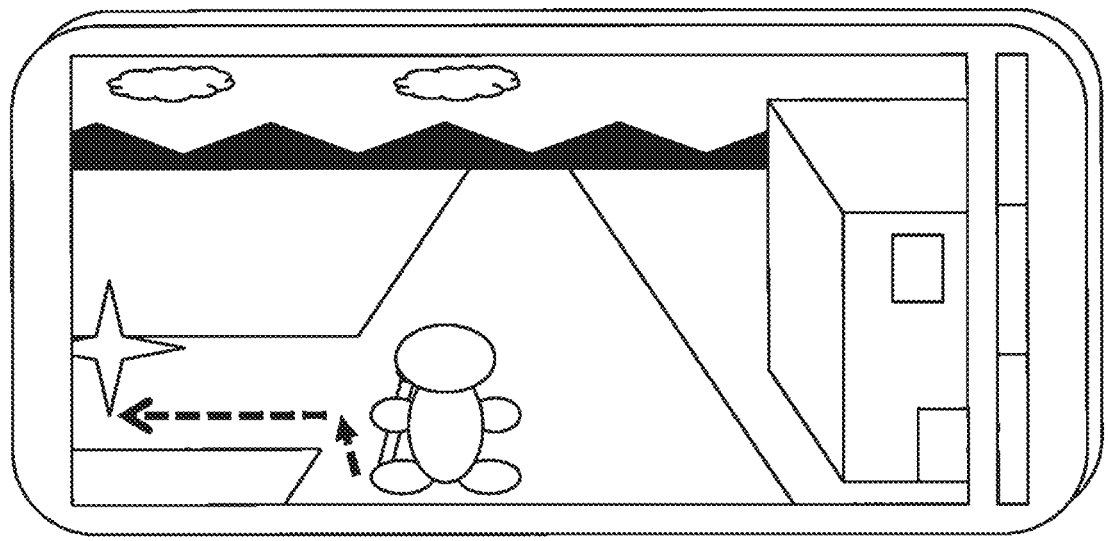

FIGS. 1 and 2 are schematic diagrams which may describe an overview of an exemplary embodiment of a game provided by a terminal apparatus.

First, FIG. 1 will be described. A terminal apparatus may display a game content positioned in a virtual space and may store information related to a destination in the virtual space. In the example illustrated in FIG. 1, the game content may be a character operated by a player. The game content may be electronic data used in various types of games or various types of services provided by a game apparatus and may be, for example, a card or an avatar.

The game content may be an item, a point, a virtual currency, a ticket, or a parameter. The game content may also be level information, status information, parameter information (a physical strength value, an offensive power, or the like), ability information (a skill, an ability, a spell, a job, or the like), or the like. The game content may be arbitrary electronic data that can be retrieved, held, used, managed, exchanged, synthesized, strengthened, sold, discarded, gifted, and/or the like by the player. Further, the usage form of the game content may not be limited to those specified in this specification.

The destination may represent a position in the virtual space which the player causes the game content to reach by operating the game content. The destination may be, for example, a position of an enemy game content or a position at which an event occurs. The destination may be a parameter change position for changing the parameter of the game content, a bifurcation point of a passage installed in the virtual space, or an installation position of an object such as a monument installed in the virtual space. The destination may be an arbitrary position which the game content can reach in the virtual space. The destination may be arbitrarily set by the player. Also, the destination may be newly added or deleted depending on a progress status of the game.

As the game content reaches the destination, the player can proceed with a match game with the enemy game content or other events. In the example illustrated in FIG. 1, the destination may be displayed, but the terminal apparatus may not display the destination. The destination may be an example of a predetermined position.

Then, the terminal apparatus may retrieve instructions for moving including a moving direction which may be given by the player. The instructions for moving may be an instruction to cause the game content to automatically move to the destination. The moving direction may be a direction which is input by the player, that is, a direction in which the game content has to move first in order to reach the destination. In other words, the instructions for moving including the moving direction may be an instruction to cause the game content to move to the destination in the virtual space. In the example illustrated in FIG. 1, the instructions for moving including the moving direction may be retrieved by the terminal apparatus when the player touches an operating unit which may be a touch panel and performs an operation of changing the touch position.

Next, FIG. 2 will be described. The terminal apparatus may calculate a route from the position of the game content in the virtual space to the destination. The route may be an arbitrary route by which the game content can reach the destination. For example, the route may be the shortest route.

Then, the terminal apparatus determines whether or not the calculated route satisfies a predetermined condition related to the moving direction, and when it is determined that the route satisfies the predetermined condition, the terminal apparatus may control the display of the game content such that the game content moves to the destination along the route. For example, the predetermined condition may be a condition that an angle formed by the direction in which the game content moves first in accordance with the calculated route and the moving direction included in the instructions for moving may be a predetermined angle or less.

As described above with reference to FIGS. 1 and 2, the terminal apparatus may display the game content positioned in the virtual space, and may store the information related to the destination in the virtual space. The terminal apparatus may retrieve the instructions for moving including the moving direction which may be given by the player. The terminal apparatus may calculate the route from the position of the game content in the virtual space to the destination. The terminal apparatus also may determine whether or not the calculated route satisfies the predetermined condition related to the moving direction, and when it is determined that the route satisfies the predetermined condition, the terminal apparatus may control the display of the game content such that the game content moves to the destination along the route. Accordingly, the terminal apparatus may support the player's operation on the game content by enabling the player to cause the game content to automatically move to the destination through the intuitive operation even when the player does not accurately know the destination.

The description of FIGS. 1 and 2 described above may be merely description for facilitating understanding of the content of the exemplary embodiment described therein. The invention may be implemented specifically in each embodiment to be described below and may be implemented by various modified examples without substantially exceeding the principles of the invention. All such modified examples may be included in the scope of the invention and the disclosure range of this specification.

Figure 3:
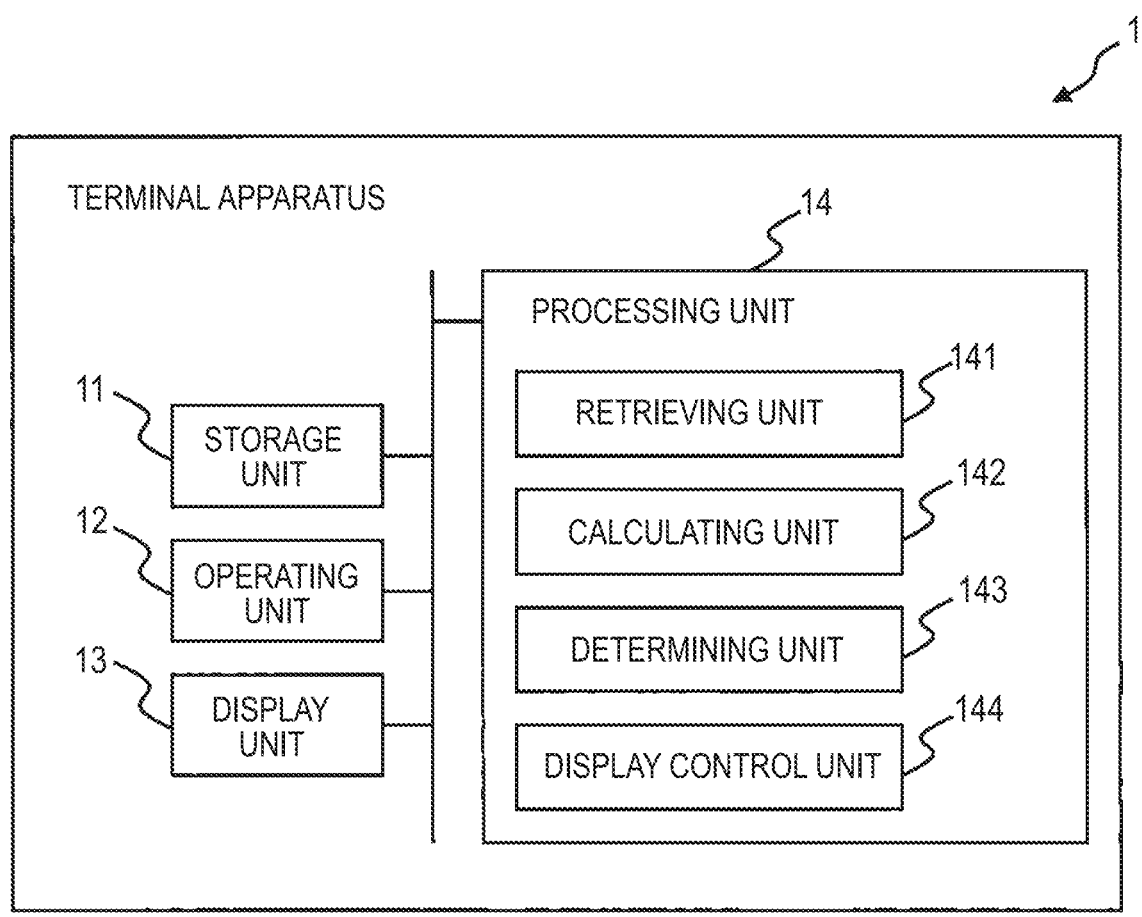
FIG. 3 is a diagram illustrating an exemplary embodiment of an overview configuration of a terminal apparatus 1.

FIG. 3 is a diagram which may illustrate an exemplary embodiment of a schematic configuration of a terminal apparatus 1.

The terminal apparatus 1 may be a communication terminal such as a multi-function mobile phone (so-called a "smartphone"). The terminal apparatus 1 may be a mobile phone (so-called "smart phone"), a mobile information terminal (a personal digital assistant (PDA)), a tablet terminal, or a tablet personal computer (PC). The terminal apparatus 1 may be a portable game machine, a portable music player, or a laptop PC.

The terminal apparatus 1 provides a game that progresses as the player operates the character. To this end, the terminal apparatus 1 may include a storage unit 11, an operating unit 12, a display unit 13, and a processing unit 14.

The storage unit 11 may include a semiconductor memory apparatus such as a read only memory (ROM) or a random access memory (RAM). The storage unit 11 may store an operating system program, a driver program, an application program, data, or the like used for processing in the processing unit 14. Examples of the driver program stored in the storage unit 11 may include an input device driver program that may control the operating unit 12 and an output device driver program that may control the display unit 13. The application program stored in the storage unit 11 may be a control program that may control the progress of the game. The data stored in the storage unit 11 may be various types of data used when the game may be executed (for example, information related to the game content or the like). Further, the storage unit 11 may temporarily store data related to a predetermined process.

The operating unit 12 may be a pointing device such as a touch panel. The operating unit 12 may be an input key. In various exemplary embodiments, the player can input letters, numbers and symbols, the position on the display screen of the display unit 13, or the like using the operating unit 12. When the operating unit 12 may be operated by the player, the operating unit 12 may generate a signal corresponding to the operation. The generated signal may be supplied to the processing unit 14 as an instruction from the player.

The display unit 13 may be a liquid crystal display. The display unit 13 may be an organic electro-luminescence (EL) display. The display unit 13 may display a video corresponding to video data supplied from the processing unit 14, an image corresponding to image data, or the like.

The processing unit 14 can be configured as a circuitry including one or more processors that operate in accordance with a computer program, one or more dedicated hardware circuits that execute at least some of various types of processes, or a combination thereof. The processing unit 14 may control an overall operation of the terminal apparatus 1 in general and is, for example, a central processing unit (CPU). The processing unit 14 may execute various types of information processing in an appropriate procedure on the basis of the program stored in the storage unit 11, various types of instructions input in accordance with the player's operation on the operating unit 12 and the like, to control the operation of the display unit 13. The processing unit 14 may execute various types of information processing on the basis of the operating system program, the driver program, and the application program stored in the storage unit 11. The processing unit 14 can execute a plurality of programs in parallel.

Hereinafter, examples of various types of screens displayed on the display unit 13 of the terminal apparatus 1 will be described with reference to FIGS. 4 and 5.

Figure 4A:
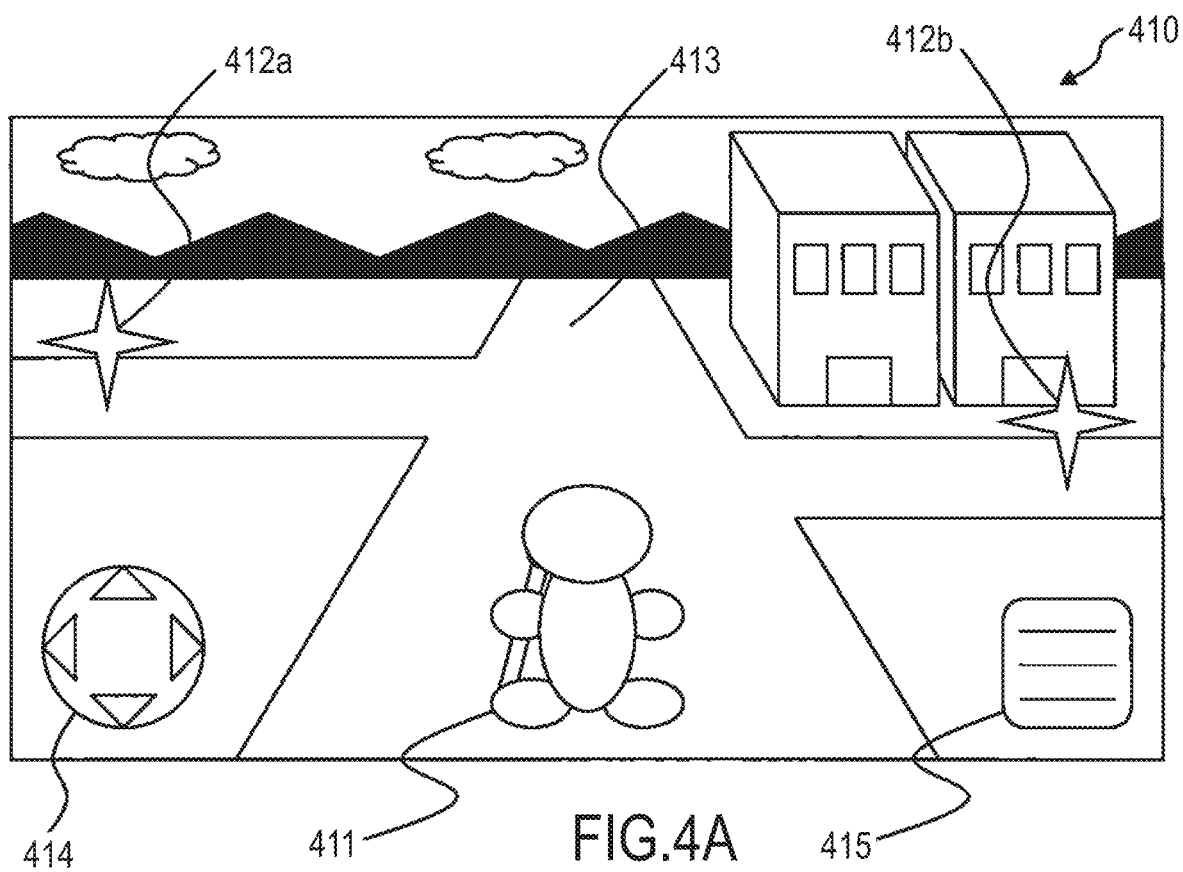
FIG. 4A is a diagram illustrating an exemplary embodiment of a field screen 410 displayed on a display unit 13 of the terminal apparatus 1.

FIG. 4A may be a diagram which may illustrate an exemplary embodiment of a field screen 410 displayed on the display unit 13 of the terminal apparatus 1. The field screen 410 may be a screen in which the player causes the game to progress by operating the game content positioned in the virtual space. In the example illustrated in FIG. 4A, the field screen 410 may include an image of a two-dimensional screen surface when a three-dimensional virtual space is projected on a predetermined two-dimensional screen surface at a predetermined point of view position in a predetermined line of sight direction in the virtual space. For example, the predetermined point of view position may be a position near the game content. Also, for example, the predetermined line of sight direction may be a direction of the position of the game content relative to the predetermined point of view position.

The field screen 410 may be displayed when the terminal apparatus 1 may retrieve a game start instruction given by the player in a main menu screen (not illustrated). The main menu screen may be displayed following a predetermined title screen or the like when an application program for executing the game may be activated in accordance with the player's operation on the operating unit 12.

The field screen 410 may include a game content 411, a destination 412a, a destination 412b, a movable area 413, an operation instruction object 414, and a menu screen display instruction object 415. Hereinafter, the destination 412a and the destination 412b may also be referred to collectively as a destination 412.

The game content 411 may be a game content that is operated by the player and may be positioned in the virtual space. As the player operates the game content 411 through the operating unit 12, the game progresses.

The destination 412 may represent a position in the virtual space at which the player has to reach by operating the game content. In the example illustrated in FIG. 4A, the destination 412 may be displayed so that the player can visually recognize the position through a predetermined object. The destination 412 may be displayed so that the player may be unable to visually recognize it. Accordingly, it may be possible to improve the operability of the user while expressing a situation close to reality in a game including a more realistic expression such as a 3D game. Also, it may be changed whether or not the destination 412 is displayed in accordance with the progress status of the game of the player. For example, the destination 412 may not be displayed until a predetermined event occurs. Accordingly, since the player may be unable to know the destination 412, the player therefore may be unable to predict content of the event on the basis of the destination 412 and thus can enjoy the game more.

For example, the destination 412 may be a position at which an enemy game content is placed. In this case, when the game content 411 reaches the destination 412, a match game screen with the enemy game content (not illustrated) is displayed, and the player can play a match game with the enemy game content. For example, the destination 412 may be a position set as an event occurrence position. In this case, when the game content 411 reaches the destination 412, an event screen (not illustrated) may be displayed, and the player can view a scenario corresponding to the event.

Also, the destination 412 may be an arbitrary position in the virtual space. For example, the destination 412 may be a bifurcation point of a passage installed in the virtual space. Accordingly, since the game content 411 stops at the bifurcation point of the passage, the player can determine a branch to select and has a sense that the game may be progressing with the player's own selection.

The movable area 413 may be an area in which the game content 411 can move in the virtual space. The movable area 413 may be set so that its shape changes in accordance with the progress status of the game of the player. For example, in accordance with the occurrence of a predetermined event, the movable area 413 may be expanded so that the game content 411 can reach a new destination 412. Accordingly, the player can advance the game in an appropriate order.

The operation instruction object 414 may be an object by which the player inputs a manual operation instruction for operating the game content 411. When the player operates the operating unit 12 and performs an input in which a position in a display area of the operation instruction object 414 may be used as an input position, the terminal apparatus 1 may retrieve a manual operation instruction including a direction corresponding to the input position as an operation direction. The terminal apparatus 1 that has retrieved the manual operation instruction may control the display of the game content 411 such that the game content 411 moves in the operation direction in the field screen 410. The direction according to the input position may be a direction with respect to the center of the display area of the operation instruction object 414 at the input position. The player can manually operate the game content 411 through the operation instruction object 414.

Hereinafter, when the player operates the operating unit 12 and performs an input in which the position in the display area of the object may be used as an input position, it may also be indicated by an expression that the player selects the object.

The menu screen display instruction object 415 may be an object by which the player inputs a menu screen display instruction to display the menu screen. When the player selects the menu screen display instruction object 415, the terminal apparatus 1 may retrieve the menu screen display instruction to display the menu screen. The terminal apparatus 1 that has retrieved the menu screen display instruction may display the menu screen (not illustrated). The menu screen may display useful information for the player to advance the game. For example, the menu screen may display information related to the game content 411, information related to the position of the game content 411, information related to the destination, information related to the movable area 413, and information related to the progress status of the game.

Figure 4B:
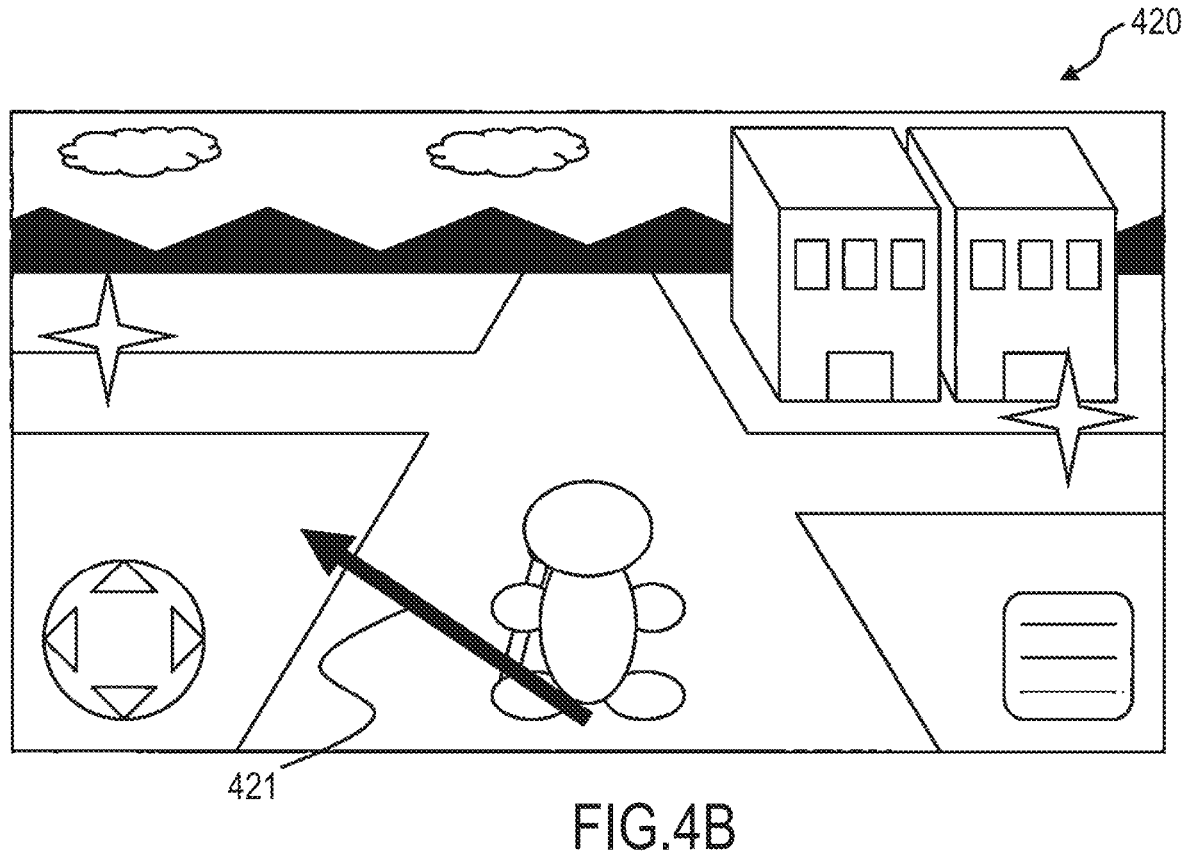
FIG. 4B is a diagram illustrating an exemplary embodiment of a field screen 420 displayed on the display unit 13 of the terminal apparatus 1.

FIG. 4B may be a diagram which may illustrate an exemplary embodiment of a field screen 420 displayed on the display unit 13 of the terminal apparatus 1. The field screen 420 may be a screen displayed when the terminal apparatus 1 may retrieve the instructions for moving including the moving direction in the field screen 410. Further, the same components as those described above may be denoted by the same reference numerals, and description thereof may be omitted. The instructions for moving including the moving direction may be retrieved by the terminal apparatus 1, for example, when the player touches the operating unit 12 which may be a touch panel and performs an operation of changing the touch position. The instructions for moving including the moving direction will be described later in detail.

The field screen 420 may include a retrieved effect for instructions for moving 421. The retrieved effect for instructions for moving 421 may be a display effect indicating that the input by the player of instructions for moving may have been received by the terminal apparatus 1. The retrieved effect for instructions for moving 421 may display the moving direction included in the for instructions for moving. In the example illustrated in FIG. 4B, the retrieved effect for instructions for moving 421 may display the moving direction with an arrow. Accordingly, the player can check whether or not the input instructions for moving have been received by the terminal apparatus 1. The player can also check the moving direction included in the input instructions for moving. Then, the player can recognize early that the game content 411 moves to the destination which may not be intended by the player in accordance with the player's erroneous operation.

The retrieved effect for instructions for moving 421 may be a display effect that disappears after a predetermined period time elapses. Accordingly, it may be possible to prevent the visibility of the field screen 420 from being lowered due to the retrieved effect for instructions for moving 421.

Figure 5A:
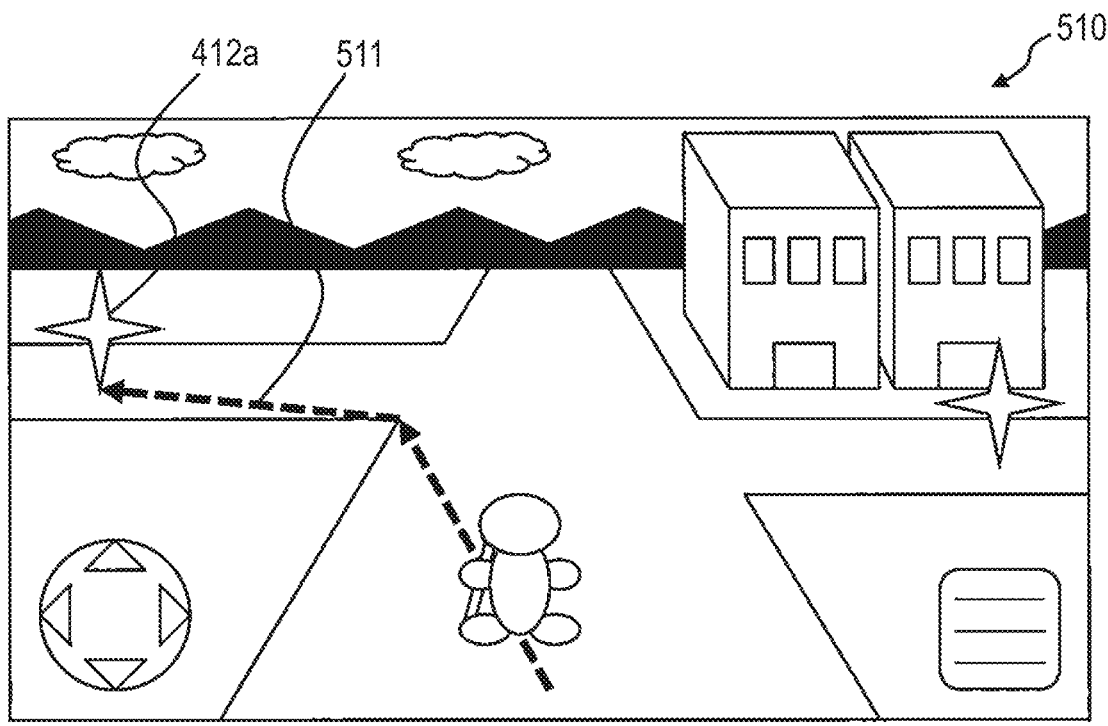
FIG. 5A is a diagram illustrating an exemplary embodiment of a field screen 510 displayed on the display unit 13 of the terminal apparatus 1.

FIG. 5A may be a diagram which may illustrate an exemplary embodiment of a field screen 510 displayed on the display unit 13 of the terminal apparatus 1. The field screen 510 may be a screen displayed when the terminal apparatus 1 controls the display of the game content 411 such that the game content 411 moves to the destination 412 along the route.

When the instructions for moving including the moving direction are input in the field screen 420, the terminal apparatus 1 may calculate a route from the position of the game content 411 to the destination 412. Then, the terminal apparatus 1 may determine whether or not the calculated route satisfies the predetermined condition related to the moving direction. Then, when it is determined that the route satisfies the predetermined condition, the terminal apparatus 1 may control the display of the game content 411 such that the game content 411 moves to the destination 412 along the route. The process for calculating the route and the process for determining whether or not the predetermined condition is satisfied through the terminal apparatus 1 will be described later in detail. In the example illustrated in FIG. 5A, it may be determined that the route to the destination 412*a* satisfies the predetermined condition.

The field screen 510 may include a route display effect 511. The route display effect 511 is a display effect that may display at least a part of the route determined to satisfy the predetermined condition in the virtual space. The route display effect 511 may be displayed when the game content 411 moves to the destination along the route. Accordingly, the player can check that the game content 411 may be moving towards the destination. Further, the player can also check the route along which the game content 411 may be moving.

The route display effect 511 may display only a part of the route from the current game content 411 position to the destination in the virtual space. Accordingly, it may be possible to prevent the visibility of the field screen 420 from being lowered due to the route display effect 511.

Even when the game content 411 moves along the route, the terminal apparatus 1 can retrieve the manual operation instruction including the operation direction. In this case, the terminal apparatus 1 may stop controlling the display of the game content such that the game content 411 moves along the route. Then, the terminal apparatus 1 may control the display of the game content 411 such that the game content 411 moves in the operation direction in the field screen 510.

Further, even when the game content 411 moves along the route, the terminal apparatus 1 can newly retrieve the instructions for moving including the moving direction. In this case, the terminal apparatus 1 may calculate the route corresponding to each of the destinations 412 from the position of the game content 411 at the time at which the instructions for moving are input. Then, a process similar to that when the movement instruction is input in the field screen 420 may be performed. Accordingly, when the player desires to cause the game content 411 to move to another destination 412 while the game content 411 is moving to the destination 412, the player can cause the game content 411 to move to the another destination 412 through a simple operation.

Figure 5B:
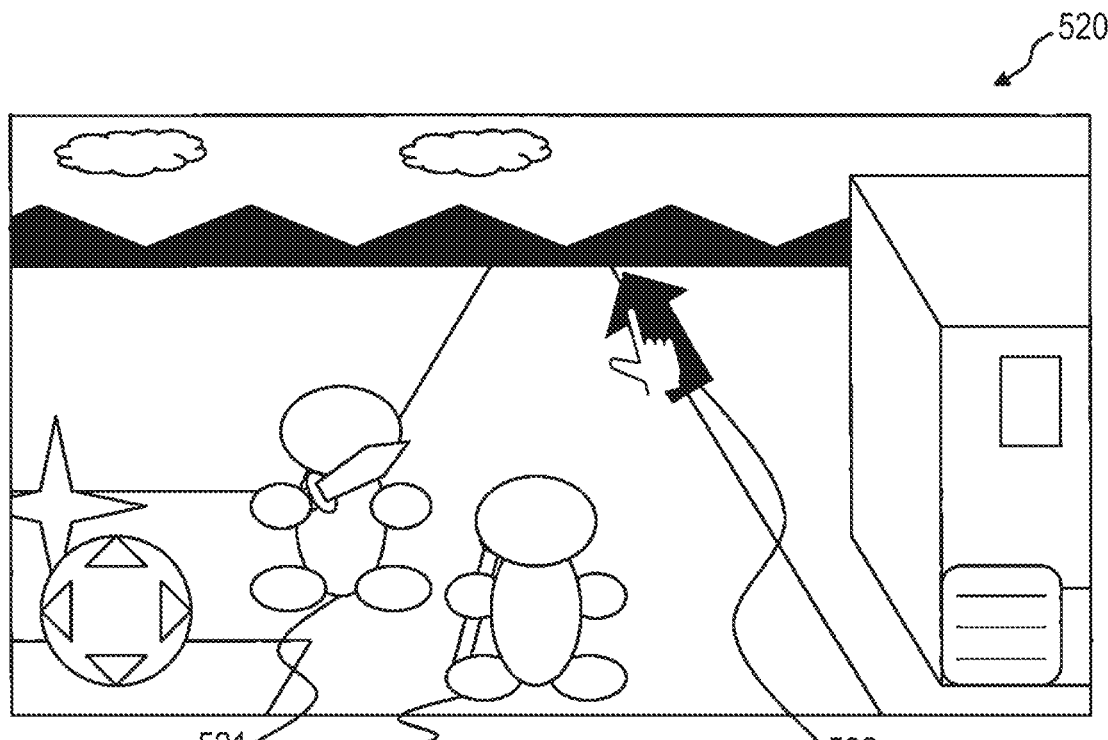
FIG. 5B is a diagram illustrating an exemplary embodiment of a field screen 520 displayed on the display unit 13 of the terminal apparatus 1.

FIG. 5B may be a diagram which may illustrate an exemplary embodiment of a field screen 520 displayed on the display unit 13 of the terminal apparatus 1. The field screen 520 may be a screen displayed when the game content 411 moving along the route touches an obstacle object before reaching the destination 412 in the field screen 510. As the game content 411 moves, the field screen 520 may include an image obtained by projecting a three-dimensional virtual space at a point of view position near the game content 411 which may be different from the field screen 510. The obstacle object may be, for example, the enemy game content. When the game content 411 moving along the route touches the obstacle object before reaching the destination 412, the terminal apparatus 1 may control the display of the game content 411 such that the game content 411 stops. Further, a case in which the game content 411 touches the obstacle object may include a case in which the game content 411 may be included in the predetermined range from the obstacle object.

Field screen 520 may include an obstacle object 521 and an input instruction effect for instructions for moving 522. The obstacle object 521 may be an object set so that the game content 411 is unable to pass through it. The obstacle object 521 may move in the virtual space under the control of the terminal apparatus 1. The input instruction effect for instructions for moving 522 may be information for urging the player to input the movement instruction. In the example illustrated in FIG. 5B, as the input instruction effect for instructions for moving 522, information for urging the player to perform an operation of touching the operating unit 12 which may be a touch panel and changing the touch position using an arrow and a finger. Accordingly, the player can recognize that it may be necessary to further operate the operating unit 12.

Further, when the game content 411 moving along the route touches the obstacle object 521 which may be the enemy game content before reaching the destination, the match game with the enemy game content may be started. The match game may proceed as the match game screen (not illustrated) is displayed on the display unit 13 of the terminal apparatus 1 or may proceed in the field screen 520. In this case, after the match game ends, the terminal apparatus 1 may control the display of the game content 411 such that the game content 411 stops.

Also, the input instruction effect for instructions for moving 522 may be a display effect for urging the user to input the movement instruction including the direction on the route along which the game content 411 was moving immediately before stopping as the moving direction. For example, the input instruction effect for instructions for moving 522 may be a display effect including an arrow indicating a direction on the route along which the game content 411 was moving immediately before stopping. Accordingly, the player can recognize the moving direction that enables the game content 411 to reach a desired destination. Also, when the game content 411 stops at a position that is not on the route, the direction indicated by the input instruction effect for instructions for moving 522 may be a direction in which the game content 411 returns to the position on the route. The game content 411 may stop at a position that may not be on the route, for example, when the game content 411 touches the obstacle object 521, the match game, the event, or the like may be started, and the game content 411 moves from the position on the route.

A process in which the terminal apparatus 1 may retrieve the instructions for moving given by the player will be described below with reference to FIGS. 6 and 7.

Figure 6A:
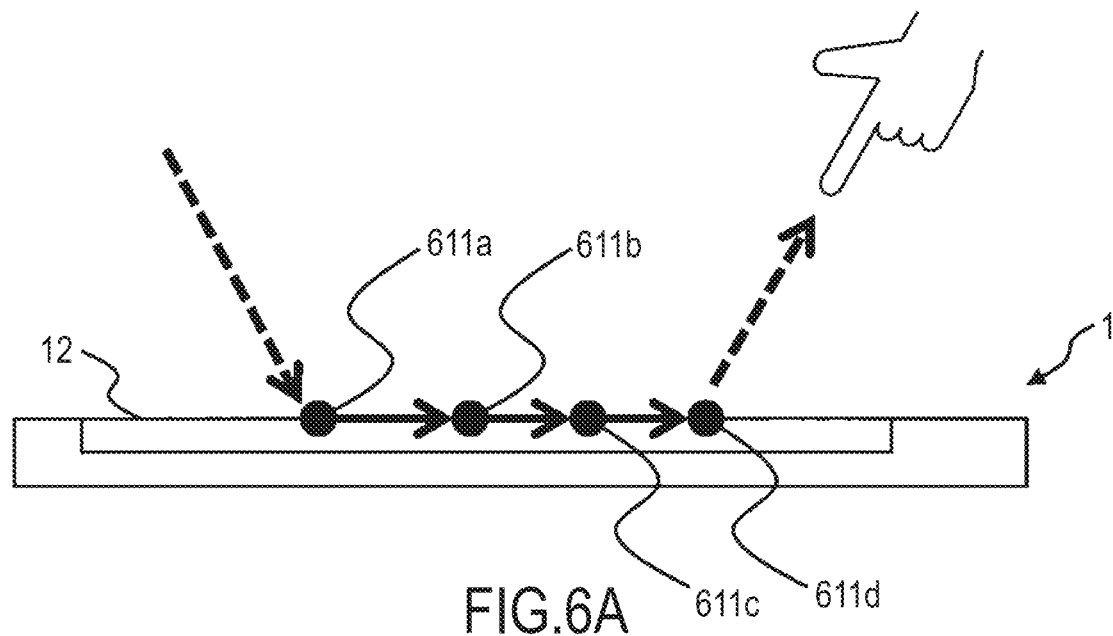
FIG. 6A is a schematic diagram of an exemplary embodiment of the terminal apparatus 1 with an operating unit 12 on the top as viewed from a side.
Figure 6B:
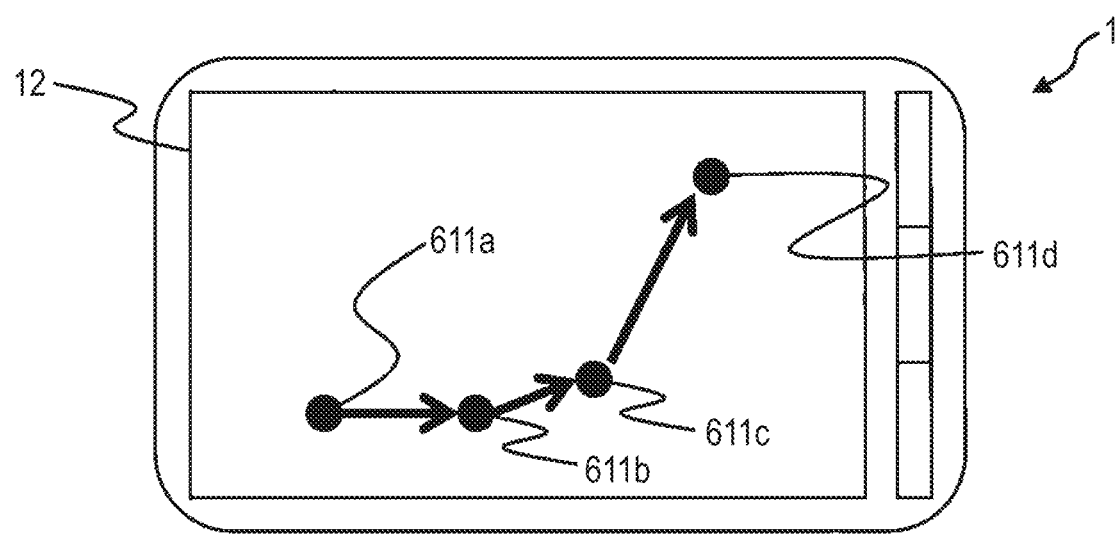
FIG. 6B is a schematic diagram of an exemplary embodiment of the terminal apparatus 1 with the operating unit 12 on the top as viewed from above.

FIG. 6A may be a schematic diagram of the terminal apparatus 1 with the operating unit 12 on the top as viewed from the side. FIG. 6B may be a schematic diagram of the terminal apparatus 1 with the operating unit 12 on the top as viewed from above. An exemplary embodiment of a process in which the terminal apparatus 1 may retrieve the instructions for moving given by the player when the operating unit 12 may be a touch panel will be described below with reference to FIGS. 6A and 6B.

First, the terminal apparatus 1 may determine whether or not the operating unit 12 detects the player's touch on the operating unit 12. In the example illustrated in FIG. 6A, the player touches a position 611*a* of the operating unit 12. Therefore, the terminal apparatus 1 may determine that the operating unit 12 detects the player's touch on the operating unit 12.

Then, when it is determined that the operating unit 12 detects the touch, the terminal apparatus 1 may set the touch position at which the player touches the operating unit 12 as the input position at predetermined time intervals (for example, 1/30 seconds). In the example illustrated in FIG. 6A, the player may change the touch position from the position 611*a* to a position 611*d*. The terminal apparatus 1 may retrieve the position 611*a*, a position 611*b*, a position 611*c*, and the position 611*d* touched by the player in the process of changing the touch position as the input positions at predetermined time intervals.

Then, the terminal apparatus 1 may determine whether or not the operating unit 12 detects the end of the player's touch on the operating unit 12. In the example illustrated in FIG. 6A, the player may end the touch after touching the position 611*d* of the operating unit 12. Therefore, the terminal apparatus 1 may determine that the operating unit 12 detects the end of the player's touch on the operating unit 12 after retrieving the position 611*d* as the input position.

Then, the terminal apparatus 1 may determine whether or not a distance between a final, lastly retrieved input position and a penultimate input position retrieved immediately previously to the final input position may be a predetermined distance or more. In the example illustrated in FIG. 6B, the final input position lastly retrieved by the terminal apparatus 1 may be the position 611*d*. The penultimate input position retrieved by the terminal apparatus 1 immediately before the position 611*d* is retrieved may be the position 611*c*. Therefore, the terminal apparatus 1 may determine whether or not the position 611*d* and the position 611*c* are apart from each other by a predetermined distance or more. The determination may be performed on the basis of position coordinates of the position 611*d* in the operating unit 12 and the position coordinates of the position 611*c* in the operating unit 12.

Then, when it is determined that the distance between the (lastly retrieved) final input position and the (immediately previously retrieved) penultimate input data is a predetermined distance or more, the terminal apparatus 1 may retrieve an operation instruction. The operation instruction may include position coordinates of a firstly retrieved input position in the operating unit 12 as coordinates of the operation position. Further, the operation instruction may include a direction of the final input position based on the penultimate input position as the moving direction. In the example illustrated in FIG. 6B, the coordinates of the operation position may be the position coordinates of the position 611*a* in the operating unit 12. The moving direction may be the direction of the position 611*d* based on the position 611*c*. The coordinates of the operation position may be an exemplary embodiment of information related to the operation position.

When it is determined that the distance between the final input position and the penultimate input data is neither a predetermined distance nor more, the terminal apparatus 1 does not retrieve the operation instruction. Accordingly, since the game content 411 may automatically move to the destination when a speed for changing the position being touched by the player is fast, operation of the game content 411 in a manner intuitive for the player is possible. Further, the player can input different game operations in accordance with the speed for changing the touched position. Further, the terminal apparatus 1 can provide various types of game operations.

Then, the terminal apparatus 1 may determine whether or not the coordinates of the operation position included in the operation instruction is within a predetermined range in response to the retrieval of the operation instruction input by the player.

Figure 7:
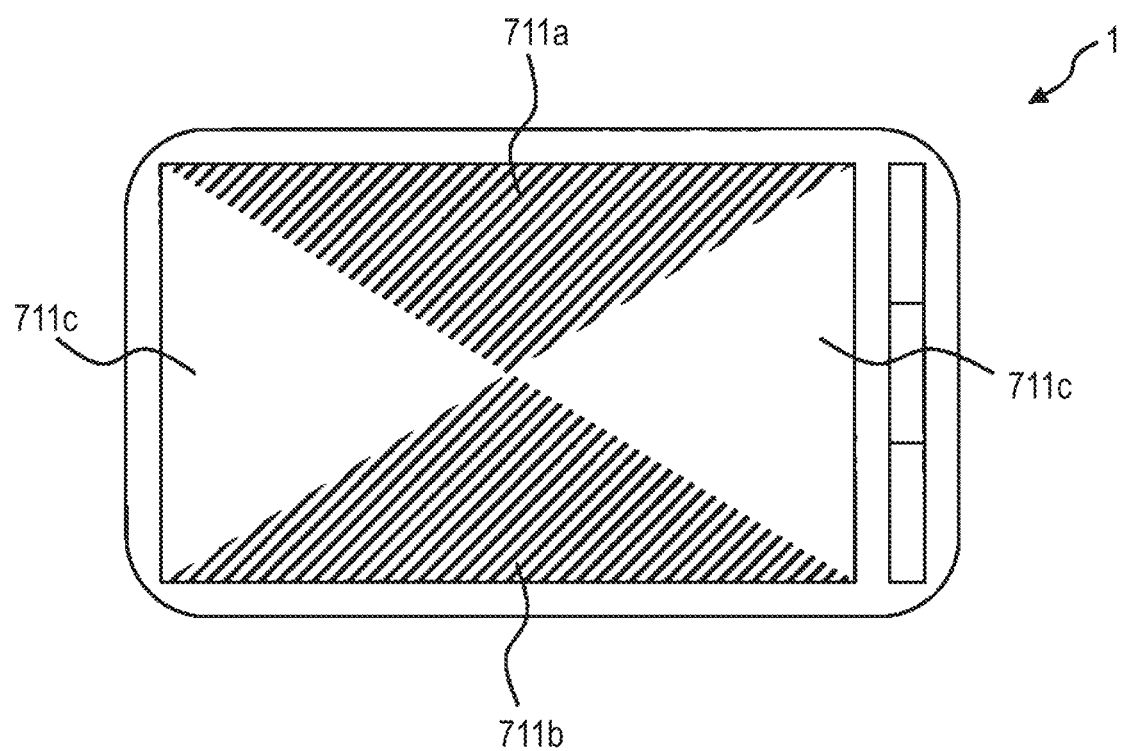
FIG. 7 is a schematic diagram of an exemplary embodiment of the terminal apparatus 1 with the operating unit 12 on the top as viewed from above.

FIG. 7 may be a schematic diagram of the terminal apparatus 1 with the operating unit 12 on the top as viewed from above. A process of determining whether or not the terminal apparatus 1 determines whether or not the coordinates of the operation position included in the operation instruction are within a predetermined range will be described below with reference to FIG. 7. In the example illustrated in FIG. 7, the operating unit 12 having a rectangular shape may include an upper area 711*a* that may be above two diagonal lines, a lower area 711*b* that may be below the two diagonal lines, and transverse areas 711*c* which may not be included in the upper area 711*a* and the lower area 711*b*.

The terminal apparatus 1 may determine whether or not the coordinates of the operation position included in the operation instruction may be included in the transverse area 711*c*. For example, the terminal apparatus 1 may determine whether or not the coordinates of the operation position are included in the transverse area 711*c* by determining whether or not the coordinates of the operation position are positioned above one of the diagonals of the operating unit 12 and positioned below the other one. When it is determined that the coordinates of the operation position are not included in the transverse area 711*c*, the terminal apparatus 1 may determine that the operation instruction is the instructions for moving. That is, the terminal apparatus 1 may retrieve the operation instruction as the instructions for moving including the coordinates of the operation position and the moving direction. When it is determined that the coordinates of the operation position may be included in the transverse area 711*c*, the terminal apparatus 1 may not retrieve the operation instruction as the instructions for moving. When the coordinates of the operation position are included in the transverse area 711*c*, it may be an exemplary embodiment in which the coordinates of the operation position may be within the predetermined range.

Accordingly, the player can input different game operations in accordance with the coordinates of the operation position included in the instructions for moving, and the terminal apparatus 1 can provide various game operations. Further, when it is determined that the coordinates of the operation position are not included in the transverse area 711c, the terminal apparatus 1 may retrieve the operation instruction as a set of point of view instructions for moving. The terminal apparatus 1 that has retrieved the point of view instructions for moving may change the display of the field screen so that at least one of the point of view position and the line of sight direction moves in accordance with the moving direction included in the instructions for moving.

A process in which the terminal apparatus 1 may calculate the route from the position of the game content in the virtual space to the destination will be described with reference to FIG. 8.

First, the terminal apparatus 1 may calculate the route from the position of the game content in the virtual space to the destination in response to the retrieval of the instructions for moving given by the player as will described later.

Figure 8A:
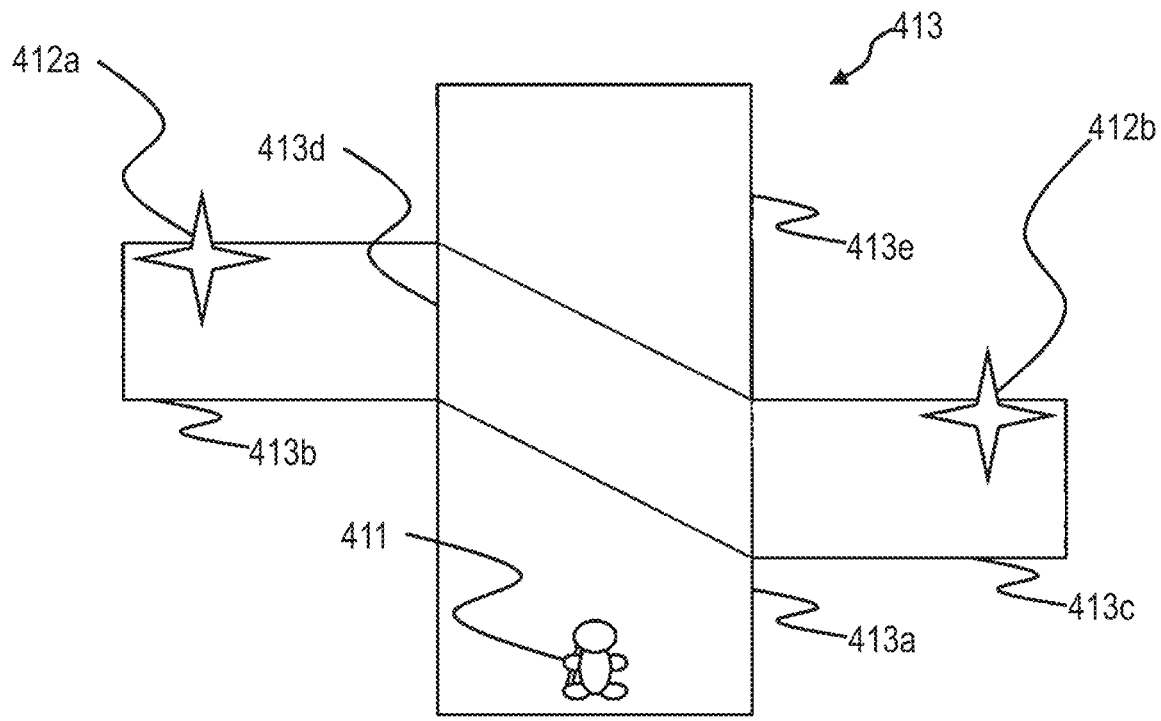
FIG. 8A is a diagram illustrating an exemplary embodiment of a process in which the terminal apparatus 1 divides a movable area 413.
Figure 8B:
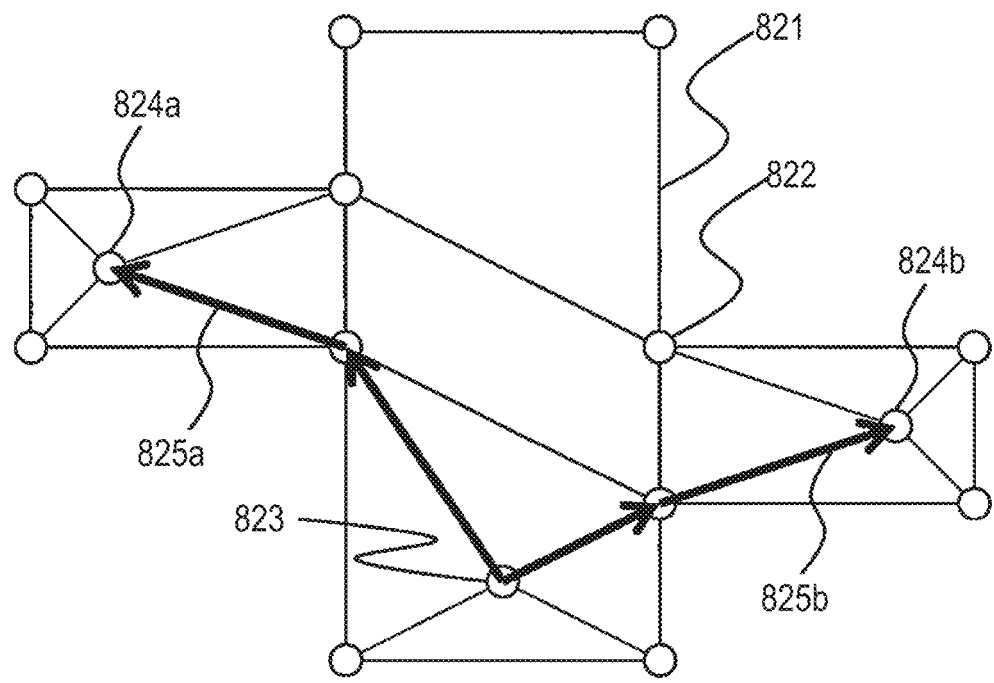
FIG. 8B is a diagram illustrating an exemplary embodiment of a process in which the terminal apparatus 1 may generate a route calculation graph and may calculate a route from a position of a game content 411 to a destination in the route calculation graph.

FIG. 8A is a diagram which may illustrate an exemplary embodiment of a process in which the terminal apparatus 1 divides the movable area 413. FIG. 8B is a diagram which may illustrate an exemplary embodiment of a process in which the terminal apparatus 1 may generate a route calculation graph and may calculate the route from the position of the game content 411 to the destination in the route calculation graph.

The terminal apparatus 1 that has retrieved the instructions for moving may specify a polygonal area including the position of the game content 411 from among a plurality of polygonal areas retrieved by dividing the movable area 413. In the example illustrated in FIG. 8A, the terminal apparatus 1 may specify that a polygonal area 413a among polygonal areas 413a to 413e retrieved by dividing the movable area 413 may be a polygonal area including the position of the game content.

A plurality of polygonal areas retrieved by dividing the movable area 413 may be stored in the storage unit 11 in advance or may be calculated by the terminal apparatus 1 as it may be determined that the coordinates of the operation position included in the instructions for moving are within the predetermined range. For example, the terminal apparatus 1 may calculate a plurality of polygonal areas retrieved by dividing the movable area 413 using a known algorithm such as a Delaunay algorithm.

Then, the terminal apparatus 1 may extract the destination 412 in which the relation with the position of the game content 411 is a predetermined relation among the destinations 412. For example, when the relation with the position of the game content 411 is a predetermined relation, it means that a distance in the virtual space from the position of the game content 411 may be a predetermined distance or less. In the example illustrated in FIG. 8A, it may be assumed that the destination 412a and the destination 412b may be extracted as the destinations 412 in which the relation with the position of the game content 411 may be a predetermined relation.

Then, the terminal apparatus 1 may specify a polygonal area including each of the extracted destinations 412. In the example illustrated in FIG. 8A, the polygonal area 413b may be specified as a polygonal area including the destination 412a. Further, the polygonal area 413c may be specified as a polygonal area including the destination 412b.

Then, the terminal apparatus 1 may generate a route calculation graph including a plurality of nodes and at least one link connecting a plurality of nodes. The nodes of the route calculation graph may include the position of the game content, the destination, and vertices of a plurality of polygonal areas. In the example illustrated in FIG. 8B, the nodes of the route calculation graph may include a vertex 822 of the polygonal areas 413a to 413e, a node 823 corresponding to the position of the game content 411, and a node 824a and a node 824b corresponding to the destination 412a and the destination 412b. Further, links of the route calculation graph may include sides of a plurality of polygonal areas and a straight line connecting the vertex of the polygonal area including the position of the game content or the destination with the node corresponding to the position of the game content or the destination. In the example illustrated in FIG. 8B, the links of the route calculation graph may include the sides of the polygonal areas 413a to 413e and the straight line connecting the vertex of the polygonal area 413a including the position of the game content 411 with the node 823 corresponding to the position of the game content 411. Similarly, the links of the route calculation graph may include a straight line connecting the vertex of the polygonal area 413b with the node 824a and a straight line connecting the vertex of the polygonal area 413c with the node 824b. As described above, since the route calculation graph may be a graph including only the extracted destination as the node, the calculation processing load necessary for calculating the route can be reduced.

Then, the terminal apparatus 1 may calculate the shortest route to each of the destinations 412 extracted from the position of the game content 411. For example, the terminal apparatus 1 may calculate the shortest route from the position of the game content to the destination using a known algorithm for obtaining the shortest route such as a Dijkstra algorithm or an A* algorithm. In the example illustrated in FIG. 8B, the terminal apparatus 1 may calculate a route 825a from the node 823 corresponding to the position of the game content 411 to the node 824a corresponding to the destination 412a and a route 825b from the node 823 to the node 824b corresponding to the destination 412b.

The shortest route may be a route with the smallest route cost. The route cost may be a value obtained by adding costs of the links included in the route. The cost of the link may be a straight-line distance (link length) in the virtual space between the nodes at both ends of the link. Accordingly, it may be possible to reduce a time required for the game content 411 to move to the destination, and it may be possible to maintain and improve the player's willingness to continue the game. The route cost may be an exemplary embodiment of a parameter related to the route.

Further, the terminal apparatus 1 may calculate a plurality of routes from the position of the game content 411 and the route cost related to each of a plurality of routes using the above-described known algorithm for retrieving the shortest route.

Note that the terminal apparatus 1 may be configured to calculate only the routes in which the route cost is a predetermined cost or less. For example, the terminal apparatus 1 may calculate only the routes in which the route cost is a predetermined cost or less by extracting only those routes in which the route cost is a predetermined cost or less from among the calculated shortest routes to each of the extracted destinations. Accordingly, it may be possible to reduce the processing load and the processing time of the process for determining whether or not the route satisfies a predetermined condition which will be described later.

The cost of the link may be a value other than the link length. For example, the cost of the link may be a value obtained by multiplying the link length by a predetermined coefficient. The predetermined coefficient may be determined in accordance with an event, a game effect, or the like that occurs when the game content 411 moves between the nodes at both ends of the link. For example, in a case in which an effect disadvantageous for the player occurs when the game content 411 moves between the nodes, the predetermined coefficient may be set to a value greater than 1. The effect disadvantageous for the player is, for example, an effect such as a decrease in a parameter such as a physical strength value of the game content 411, a decrease in a movement speed of the game content, or a touch with the enemy game content. Further, in a case in which an effect advantageous for the player occurs when the game content 411 moves between the nodes, the predetermined coefficient may be set to a value smaller than 1. The effect advantageous for the player is, for example, an effect such as an increase in a parameter of the game content, an increase in the movement speed of the game content, or an acquisition of the game content such as an item. Accordingly, the game content 411 moves to the destination along the route that is advantageous for the player, and it motivates the player to input the instructions for moving.

The route calculated by the above description may be the shortest route in the route calculation graph. The terminal apparatus 1 may calculate the shortest route in the movable area 413 by further executing a smoothing process on the calculated routes.

Figure 9:
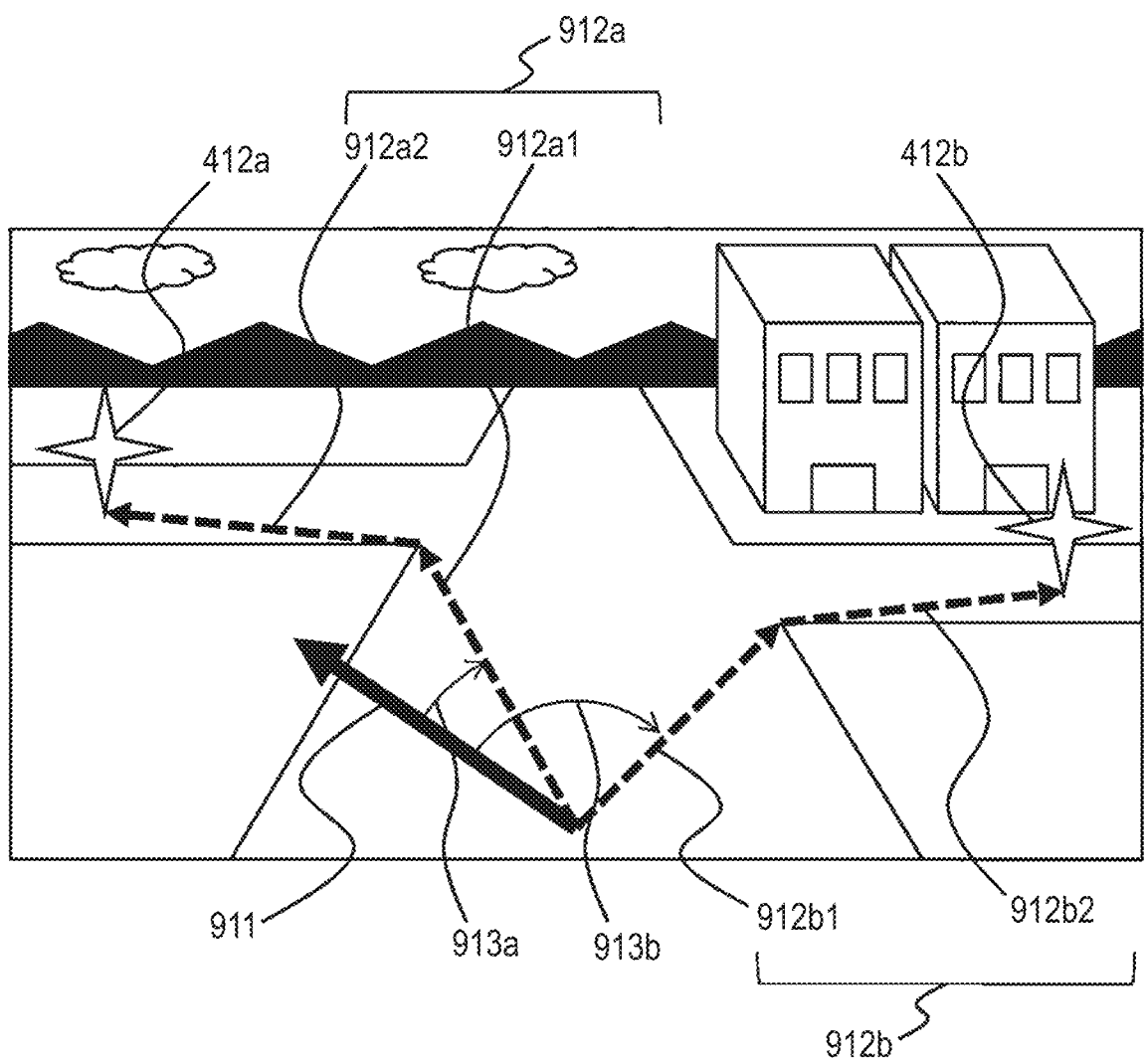
FIG. 9 is a diagram detailing an exemplary embodiment in which a calculated route and a moving direction are displayed on a field screen 910.

A process in which the terminal apparatus 1 may determine whether or not the calculated route satisfies a predetermined condition related to the moving direction will be described below with reference to FIG. 9. FIG. 9 is a diagram which may illustrate a calculated route and a moving direction displayed on a field screen 910. The field screen 910, a moving direction 911, a route 912*a* from the position of the game content to the destination 412*a*, and a route 912*b* from the position of the game content to the destination 412*b* may be illustrated in FIG. 9. The route 912*a* may include an element of the route 912*a*1 connected to the position of the game content and an element of the route 912*a*2 connected to the element of the route 912*a*1. The route 912*b* may include an element of the route 912*b*1 connected to the position of the game content and an element of the route 912*b*2 connected to the element of the route 912*b*1. The element of the route refers to a straight-line part constituting the route and corresponds to one link in the route calculation graph. Hereinafter, an element of the route connected to the position of the game content among the elements of the route constituting the route may be referred to as a first element of the route. In the example illustrated in FIG. 9, the first element of the route among the elements of the route constituting the route 912*a* may be the element of the route 912*a*1. The first element of the route among the elements of the route constituting the route 912*b* may be the element of the route 912*b*1. The moving direction 911, the route 912*a*, and the route 912*b* may be ones illustrated for description and may not be displayed on the field screen 910.

First, the terminal apparatus 1 may calculate a size of an angle formed by the moving direction 911 included in the instructions for moving and the direction of the first element of the route among the elements of the route constituting the calculated route. In the example illustrated in FIG. 9, the terminal apparatus 1 may calculate a size of an angle 913*a* formed by the moving direction 911 and the direction of the element of the route 912*a*1. Similarly, the terminal apparatus 1 may calculate a size of an angle 913*b* formed by the moving direction 911 and the direction of the element of the route 912*b*1.

Then, the terminal apparatus 1 may determine whether or not the calculated size of the angle may be a predetermined angle or less. In the example illustrated in FIG. 9, it may be assumed that the terminal apparatus 1 may determine that the angle 913*a* may be a predetermined angle or less and the angle 913*b* may be neither a predetermined angle nor less. As described above, the terminal apparatus 1 may determine whether or not the angle between the moving direction and the direction of the first element of the route may be a predetermined angle or less. Further, when the angle between the moving direction and the direction of the first element of the route is a predetermined angle or less, it may be an exemplary embodiment in which the predetermined condition related to the moving direction may be satisfied.

Then, the terminal apparatus 1 may control the display of the game content such that the game content moves to the destination along the route in which the angle may be determined to be a predetermined angle or less. Accordingly, the difference between the moving direction included in the instructions for moving and the direction in which the game content moves initially may become smaller, and it may be possible for operations to be intuitive.

Further, when it is determined in a plurality of routes that the angle between the moving direction and the direction of the first element of the route is a predetermined angle or less, the terminal apparatus 1 may control the display of the game content 411 such that the game content moves to the destination along the route with the smallest route cost. Accordingly, when there are a plurality of destinations in the same direction, the game content 411 may move to the closest destination, and thus the traveling time can be reduced.

In the above description, the direction of the first element of the route may be the direction of the first element of the route in a two-dimensional screen when the first element of the route defined in a three-dimensional virtual space is projected onto the two-dimensional screen at a predetermined point of view position in a predetermined line of sight direction. That is, the direction of the first element of the route may not be the direction in the three-dimensional virtual space but the direction of the first element of the route in the field screen displayed on the display unit 13. With the above definition, the player may only need to input the instructions for moving on the basis of the direction displayed on the display unit 13, and thus a more intuitive operation may be possible.

Various types of data stored in the storage unit 11 will be described below with reference to FIG. 10.

FIG. 10A is a diagram which may illustrate an exemplary embodiment of a data structure of an area table 1010 that manages information related to the polygonal area. In the area table 1010, an area ID1011, a vertex 1012, an adjacent area ID1013, and the like may be stored in association with each other.

The area ID1011 may be identification information uniquely identifying the polygonal area. The vertex 1012 may be information uniquely identifying the vertex of the polygonal area. In the example illustrated in FIG. 10A, the vertex 1012 may be the coordinates of the vertex of the polygonal area. In the example illustrated in FIG. 10A, three coordinates may be stored in the vertex 1012. That is, in the example illustrated in FIG. 10A, the polygonal area may be a triangle. In the example illustrated in FIG. 10A, the coordinates of each vertex may be described in a two-dimensional coordinate system but may be described in a three-dimensional coordinate system or may be described in other coordinate systems. The adjacent area ID1013 may be identification information of other polygonal areas adjacent to the polygonal area. The adjacent polygonal areas may be polygonal areas that share at least one side.

FIG. 10B is a diagram which may illustrate an exemplary embodiment of a data structure of a destination table 1020 that manages information related to the destination. In the destination table 1020, a destination ID1021, a position 1022, an area ID1023, and the like may be stored in association with each other. Further, the data stored in the destination table 1020 may be an exemplary embodiment of information related to the destination in the virtual space.

The destination ID1021 may be identification information uniquely identifying the destination. The position 1022 may be coordinates representing the position of the destination. The area ID1023 may be identification information of a polygonal area including the destination therein.

The processing unit 14 of the terminal apparatus 1 will be described below.

As illustrated in FIG. 3, the processing unit 14 may include a retrieving unit 141, a calculating unit 142, a determining unit 143, and a display control unit 144 as its function blocks. Each of these units may be a function module realized by a program executed by the processor installed in the processing unit 14. Each of these units may be installed in the terminal apparatus 1 as firmware.

The retrieving unit 141 may retrieve the instructions for moving including the moving direction given by the player. For example, the retrieving unit 141 may determine whether or not the operating unit 12 detects the player's touch on the operating unit 12. When it is determined that the touch is detected, the retrieving unit 141 may retrieve the touch position at which the player is touching the operating unit 12 as the input position at predetermined time intervals.

Then, the retrieving unit 141 may determine whether or not the operating unit 12 detects the end of the player's touch on the operating unit 12. When it is determined that the end of the touch is detected, the retrieving unit 141 may determine whether or not the distance between the final input position and the penultimate input position is a predetermined distance or more. When it is determined that the distance is a predetermined distance or more, the retrieving unit 141 may retrieve the operation instruction. The operation instruction may include the position coordinates in the operating unit 12 of the initially retrieved input position as the coordinates of the operation position. Further, the operation instruction may include the direction of the final input position with respect to the penultimate input position as the moving direction.

Then, the retrieving unit 141 may determine whether or not the coordinates of the operation position included in the operation instruction are within a predetermined range. When it is determined that the coordinates of the operation position may not be within the predetermined range, the retrieving unit 141 may retrieve the operation instruction as the instructions for moving. When it may be determined that the coordinates of the operation position are within the predetermined range, the retrieving unit 141 may not retrieve the instructions for moving. When it is determined that the coordinates of the operation position are within the predetermined range, the retrieving unit 141 may retrieve the operation instruction as the point of view instructions for moving.

Also, the retrieving unit 141 may retrieve the manual operation instruction for operating the game content 411 which may be given by the player. For example, the retrieving unit 141 may retrieve the manual operation instruction including the direction corresponding to the input position as the operation direction when the player sets the area in the display area of the operation instruction object 414 in the field screen 410 as the input position by operating the operating unit 12.

Further, the retrieving unit 141 may retrieve the menu screen display instruction for displaying the menu screen which may be given by the player. For example, the retrieving unit 141 may retrieve the menu screen display instruction as the player selects the menu screen display object in the field screen 410 by operating the operating unit 12.

The calculating unit 142 may specify the polygonal area including the position of the game content 411 from among a plurality of polygonal areas retrieved by dividing the movable area 413 as the retrieving unit 141 may retrieve the instructions for moving given by the player. Then, the calculating unit 142 may extract the destination 412 in which the distance in the virtual space from the position of the game content is a predetermined distance or less with reference to the destination table 1020. Then, the calculating unit 142 may specify the polygonal area including each of the extracted destinations 412 with reference to the destination table 1020. Then, the calculating unit 142 may generate the route calculation graph. Then, the calculating unit 142 may calculate a route to each of the destinations 412 extracted from the position of the game content 411. Further, the calculating unit 142 may calculate the route cost related to each route.

Further, the calculating unit 142 may calculate only the route in which the route cost may be a predetermined cost or less among the routes to the extracted destination 412. For example, the calculating unit 142 may calculate only the route in which the route cost is a predetermined cost or less by extracting only the route in which the route cost is a predetermined cost or less from among the calculated shortest routes to each of the extracted destinations.

As described above, the calculating unit 142 may not calculate the route to each of the destinations 412 extracted from the position of the game content 411 when the coordinates of the operation position included in the instructions for moving given by the player may be within a predetermined range.

The determining unit 143 may determine whether or not the calculated route satisfies a predetermined condition related to the moving direction. For example, the predetermined condition may be a condition that the size of the angle formed by the moving direction and the direction of the first element of the route connected to the position of the game content 411 among the elements of the route constituting the route may be a predetermined angle (for example, 60°) or less. Further, when a plurality of routes may be calculated by the calculating unit 142, the determining unit 143 may determine whether or not the predetermined condition related to the moving direction is satisfied for each of the calculated routes.

When it is determined that the route satisfies the predetermined condition, the display control unit 144 may control the display of the game content such that the game content moves to the destination along the route. For example, the display control unit 144 may control the display of the game content by supplying the display unit 13 with display data for displaying an image as if the game content were walking in the moving direction.

When it is determined that the route satisfies the predetermined condition, the display control unit 144 may control the display unit 13 such that at least a part of the route may be displayed in the virtual space. For example, the display control unit 144 may display only the part of the route from the current position of the game content 411 to the destination 412 in the virtual space.

When it is determined that a plurality of routes satisfy the predetermined condition, the display control unit 144 may control the display of the game content such that the game content moves along the route with the smallest route cost among the routes determined to satisfy the predetermined condition.

Also, the display control unit 144 may control the display of the game content such that the game content may stop when the game content moving along the route touches the obstacle object before reaching the destination.

Also, the display control unit 144 may display information for urging the player to input the instructions for moving on the display unit when the game content moving along the route may stop before reaching the destination.

Also, when the route is determined not to satisfy the predetermined condition, the display control unit 144 may control the display unit 13 to control the display of the game content such that the game content moves straight in the moving direction included in the instructions for moving input by the player. Accordingly, even when there may be no destination in the moving direction, the player can cause the game content to move in the moving direction and provide the operation more intuitive for the player. The display control unit 144 may control the display of the game content such that the game content may stop when the game content, moving straight, reaches the outer edge of the movable area.

The display control unit 144 may control the display of the game content such that the game content moves in the operation direction included in the manual operation instruction as the retrieving unit 141 retrieves the manual operation instruction given by the player.

The display control unit 144 may control the display unit 13 such that the menu screen may be displayed as the retrieving unit 141 retrieves the menu screen display instruction given by the player. For example, the display control unit 144 may retrieve the display data for displaying the menu screen from the storage unit 11 and may supply it to display unit 13.

Further, as the retrieving unit 141 retrieves the point of view instructions for moving given by the player, the display control unit 144 may control the display unit 13 such that the display of the field screen is changed so that at least one of the point of view position and the line of sight direction moves. For example, the display control unit 144 causes the point of view position to move in the moving direction included in the point of view instructions for moving, and may change the display of the field screen so that the direction of the game content based on the moved point of view position may be set as the point of view direction.

Hereinafter, the flow of a process by the terminal apparatus 1 will be described with reference to FIGS. 11 to 13.

Figure 11:
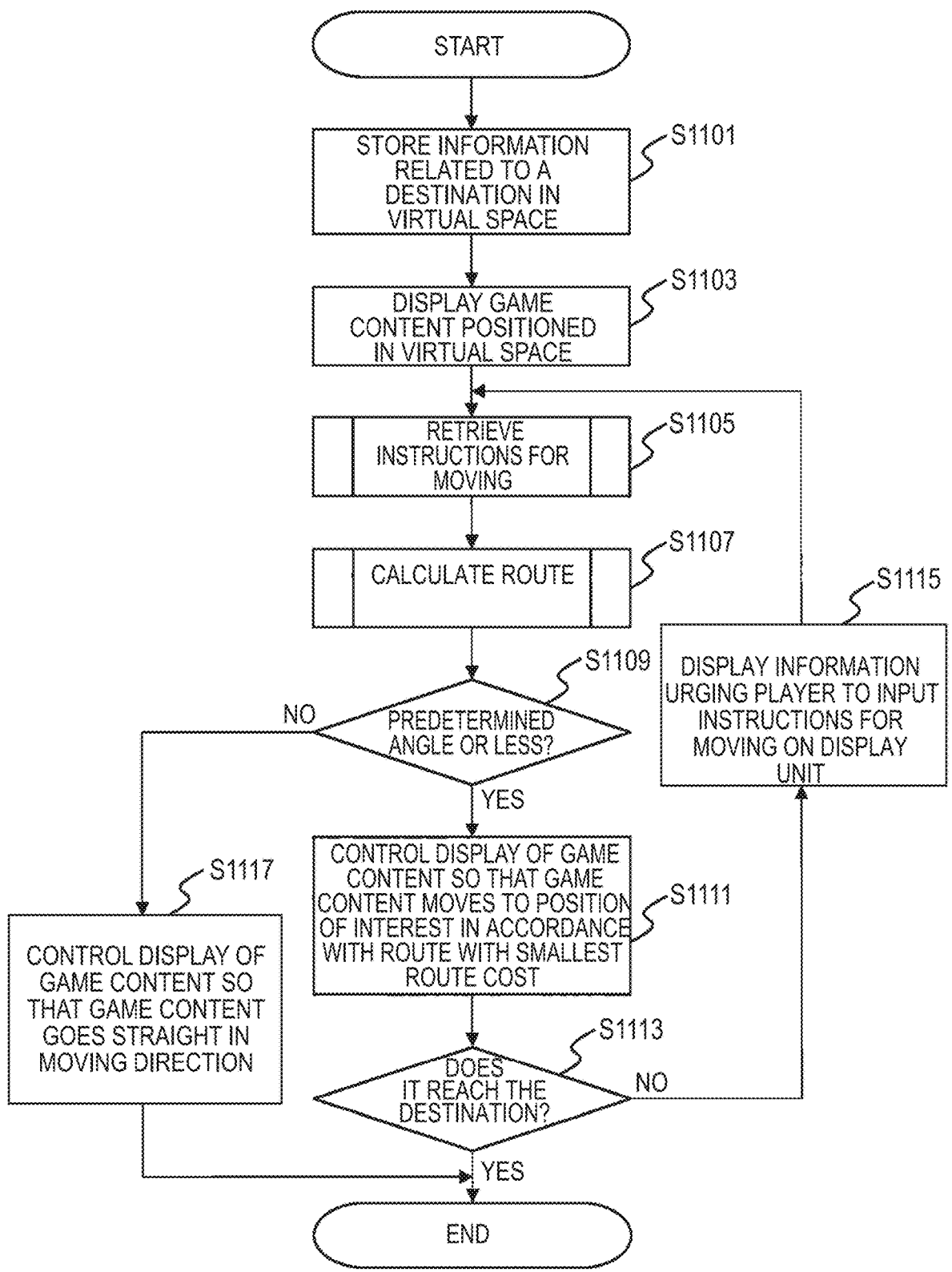
FIG. 11 is a flowchart illustrating an exemplary embodiment of a movement process in the terminal apparatus 1.

FIG. 11 is a flowchart which may illustrate an exemplary embodiment of the flow of a movement process by the terminal apparatus 1.

First, the storage unit 11 of the terminal apparatus 1 may store information related to the destination in the virtual space (S1101). Then, the display unit 13 of the terminal apparatus 1 may display the game content positioned in the virtual space (S1103). Then, the retrieving unit 141 of the terminal apparatus 1 may execute a process of retrieving the instructions for moving (S1105). The process of retrieving the instructions for moving will be described later in detail. Then, the calculating unit 142 of the terminal apparatus 1 may execute a process of calculating the route (S1107). The process for calculating the route will be described later in detail.

Then, the determining unit 143 of the terminal apparatus 1 may determine whether or not the size of the angle formed by the moving direction included in the movement instruction and the direction of the first element of the route connected to the position of the game content among the elements of the route constituting the calculated route is a predetermined angle or less (S1109). When it is determined that the angle is a predetermined angle or less (Y in S1109), the display control unit 144 of the terminal apparatus 1 may control the display of the game content such that the game content moves along the route (S1111). Then, the display control unit 144 may determine whether or not the game content moving along the route reaches the destination (S1113). When it is determined that it does not reach the destination, that is, when it is determined that the game content moving along the route has stopped before reaching the destination (N in S1113), the display control unit 144 may display information for instructing the player to input the instructions for moving (S1115), and the process may proceed to S1105. When it is determined that it reaches the destination (Y in S1113), a series of processes ends. Also, when it is determined that the size of the angle is neither a predetermined angle nor less (N in S1109), the display control unit 144 may control the display of the game content such that the game content moves straight in the moving direction included in the instructions for moving (S1117), and a series of processes ends.

Figure 12:
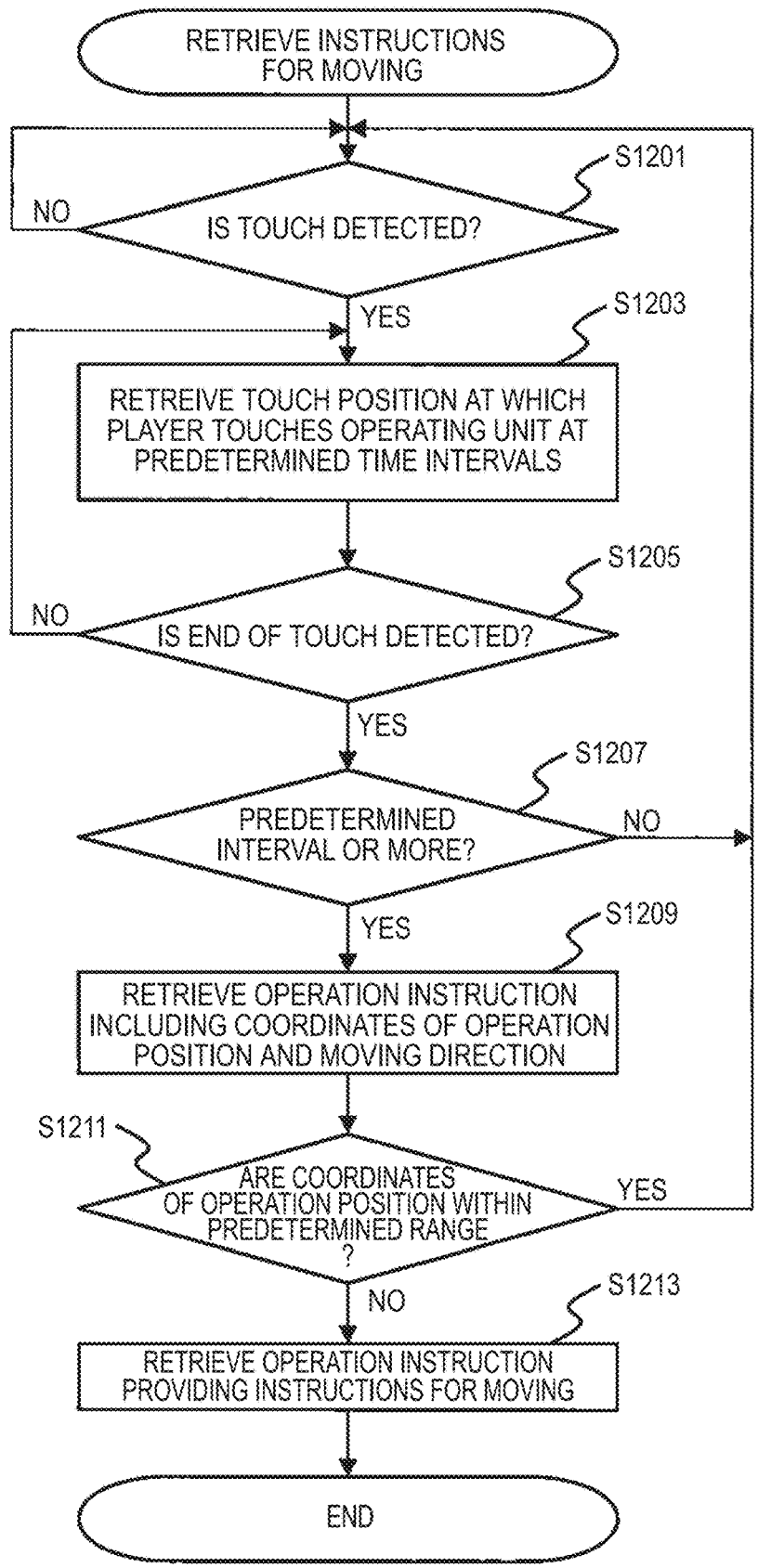
FIG. 12 is a flowchart illustrating an exemplary embodiment of a process for retrieving instructions for moving in the terminal apparatus 1.

FIG. 12 is a flowchart which may illustrate an exemplary embodiment of the flow of the process for retrieving instructions for moving in the terminal apparatus 1. First, the retrieving unit 141 of the terminal apparatus 1 may determine whether or not the operating unit 12 detects the player's touch on the operating unit 12 (S1201). When it is determined that the touch is not detected (N in S1201), the process may proceed to S1201. When it is determined that the touch has been detected (Y in S1201), the retrieving unit 141 may retrieve the touch position at which the player may be touching the operating unit as the input position at predetermined time intervals (S1203). Then, the retrieving unit 141 may determine whether or not the operating unit 12 detects the end of the player's touch on the operating unit 12 (S1205). When it is determined that the end of the touch has not been detected (N in S1205), the process may proceed to S1203. When it is determined that the end of the touch has been detected (Y in S1205), the retrieving unit 141 may determine whether or not the distance between the final input position and the penultimate input position is a predetermined distance or more (S1207). When it is determined that the distance is a predetermined distance or more (Y in S1207), the retrieving unit 141 may retrieve the operation instruction including the coordinates of the operation position and the moving direction (S1209). When it is determined that the distance is neither a predetermined distance nor more (N in S1207), the process may proceed to S1201. Then, the retrieving unit 141 may determine whether or not the coordinates of the operation position included in the operation instruction are within a predetermined range (S1211). When it is determined that the coordinates of the operation position are not within the predetermined range (N in S1211), the retrieving unit 141 may retrieve the operation instruction as the instructions for moving (S1213) and a series of processes ends. When it is determined that the coordinate of the operation position are within the predetermined range (Y in S1211), the process may proceed to S1201.

Figure 13:
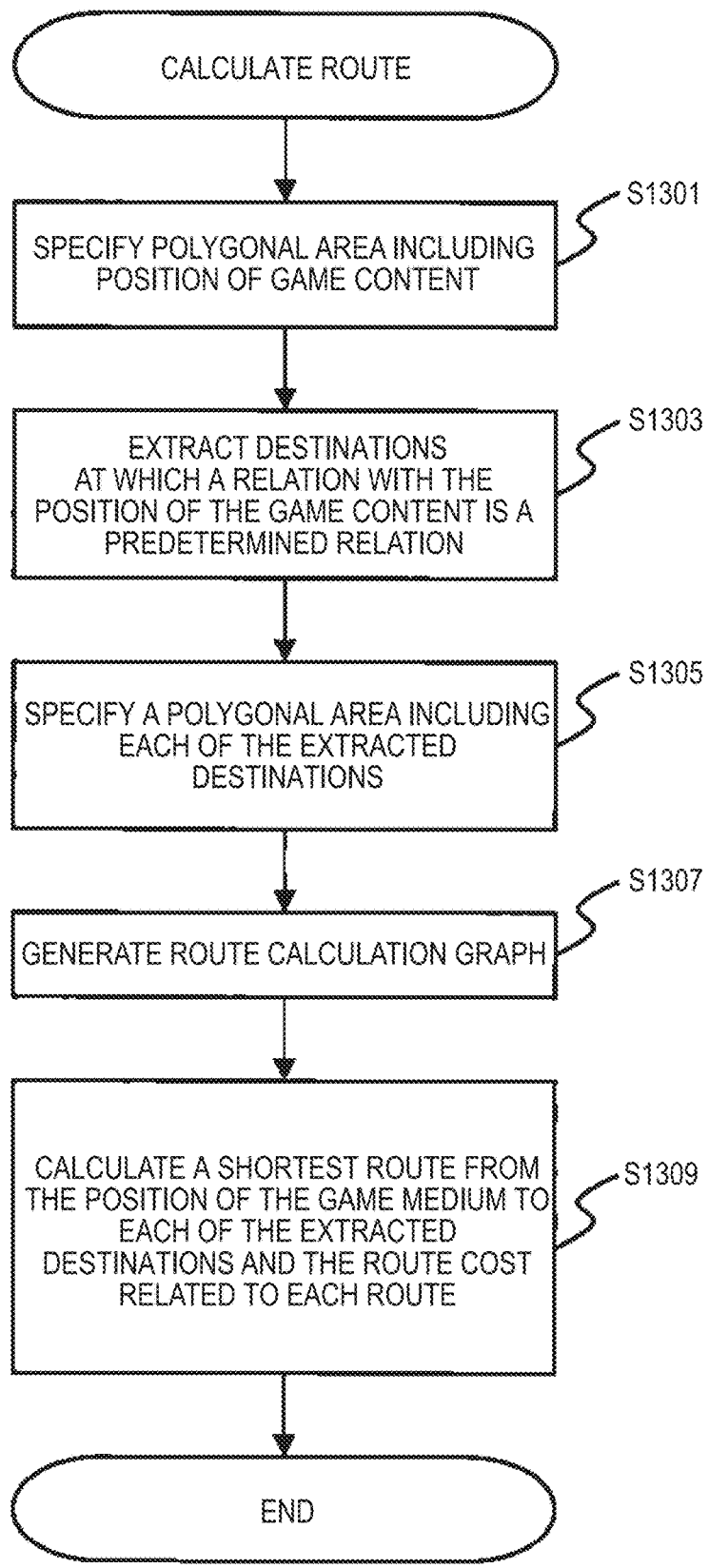
FIG. 13 is a flowchart illustrating an exemplary embodiment of a process of calculating a route in the terminal apparatus 1.

FIG. 13 is a flowchart which may illustrate an exemplary embodiment of the flow of the process of calculating the route in the terminal apparatus 1. First, the calculating unit 142 of the terminal apparatus 1 may specify the polygonal area including the position of the game content (S1301). Then, the calculating unit 142 may extract the destinations at which the relation with the position of the game content 411 is a predetermined relation among the destinations (S1303). Then, the calculating unit 142 may specify the polygonal area including each of the extracted destinations (S1305). Then, the calculating unit 142 may generate the route calculation graph (S1307). Then, the calculating unit 142 may calculate the shortest route to each of the destinations extracted from the position of the game content and the route cost related to each route (S1309), and a series of processes ends.

As described above, the terminal apparatus 1 according to an exemplary embodiment may include the display unit 13 that may display the game content positioned in the virtual space. Further, the terminal apparatus 1 according to an exemplary embodiment may include the storage unit 11 that may store information related to the destination in the virtual space. The terminal apparatus 1 according to an exemplary embodiment may include the retrieving unit 141 that may retrieve the instructions for moving including the moving direction given by the player. The terminal apparatus 1 according to an exemplary embodiment may include the calculating unit 142 that may calculate the route from the position of the game content in the virtual space to the destination. The terminal apparatus 1 according to an exemplary embodiment also may include the determining unit 143 that may determine whether or not the calculated route satisfies a predetermined condition related to the moving direction. Further, the terminal apparatus 1 according to an exemplary embodiment may include the display control unit 144 that may control the display of the game content such that the game content moves to the destination along the route when it is determined that the route satisfies the predetermined condition. With such a configuration, the terminal apparatus 1 according to an exemplary embodiment can support the player's operation on the character.

In the terminal apparatus 1 according to an exemplary embodiment, the route may include a plurality of elements of the route. Further, the predetermined condition may be a condition that a size of an angle formed by the moving direction and a direction of the element of the route connected to the position of the game content may be a predetermined angle or less. Accordingly, since the game content moves in the direction close to the moving direction included in the instructions for moving input by the player, the operation intuitive for the player may be realized.

In the terminal apparatus 1 according to an exemplary embodiment, the instructions for moving may include information related to an operation position. The calculating unit 142 may not calculate the route when the information related to the operation position may be within a predetermined range. Accordingly, when the information related to the operation position may be within the predetermined range, it becomes possible to assign different game operations, and the diversity of game operations increases.

In the terminal apparatus 1 according to an exemplary embodiment, the display control unit 144 may control the display of the game content such that the game content moves in the moving direction when it may be determined that the route does not satisfy the predetermined condition. Accordingly, even when the route does not satisfy the predetermined condition, the game content moves in the direction close to the moving direction included in the instructions for moving input by the player, and thus an operation more intuitive for the player may be realized.

In the terminal apparatus 1 according to an exemplary embodiment, the display control unit 144 may display at least a part of the route in the virtual space when it may be determined that the route satisfies the predetermined condition. Accordingly, the player can easily check the route that the game content is to move from now on.

In the terminal apparatus 1 according to an exemplary embodiment, the display control unit 144 may display information for urging the player to input the instructions for moving on the display unit when the game content moving along the route may stop before reaching the predetermined position. Accordingly, the player can recognize that the user has to further operate the operating unit 12.

Further, the terminal apparatus 1 according to an exemplary embodiment may include an operating unit 12 that detects a touch by the player. In the terminal apparatus 1 according to an exemplary embodiment, the retrieving unit 141 may retrieve a touch position at which the player touches the operating unit 12 at predetermined time intervals. The moving direction may be a direction of the touch position lastly retrieved by the retrieving unit 141 which may be based on a penultimate touch position. Accordingly, the player can cause the game content to move by changing the touch position in the direction in which the game content may be desired to be moved, and the more intuitive operations may be possible.

Also, in the terminal apparatus 1 according to an exemplary embodiment, the display control unit 144 may control display of the game content such that the game content moves along a route having the smallest route cost among the routes determined to satisfy the predetermined condition when a plurality of routes may be determined to satisfy the predetermined condition. Accordingly, when there are a plurality of destinations in the same direction, the game content may move to the closest destination, and thus the movement time can be reduced.

Further, in the terminal apparatus 1 according to an exemplary embodiment, the calculating unit 142 may calculate a route to a destination in which a relation with the position of the game content is a predetermined relation. Accordingly, it may be possible to reduce the load of the calculation process required to calculate the route.

Further, according to an exemplary embodiment, a control method of the terminal apparatus 1 including the storage unit 11 and the display unit 13 that may display the game content positioned in the virtual space may include storing information related to a predetermined position in the virtual space in the storage unit 11. The control method according to an exemplary embodiment may include retrieving instructions for moving including a moving direction given by a player. The control method according to an exemplary embodiment may include calculating a route from a position of the game content in the virtual space to the predetermined position. The control method according to an exemplary embodiment may include determining whether or not the calculated route satisfies a predetermined condition related to the moving direction. The control method according to an exemplary embodiment may include controlling display of the game content such that the game content moves to the predetermined position along the route when it may be determined that the route satisfies the predetermined condition. With such a configuration, the control method according to an exemplary embodiment can support the player's operation on the character.

Further, the control program of the terminal apparatus 1 including the storage unit 11 and the display unit 13 that may display the game content that positions in the virtual space according to an exemplary embodiment causes the terminal apparatus 1 to include storing information about the predetermined position in the virtual space in the storage unit 11. Further, the control method according to an exemplary embodiment causes the terminal apparatus 1 to include retrieving instructions for moving including a moving direction by the player. Also, the control method according to an exemplary embodiment causes the terminal apparatus 1 to include calculating the route from the position of the game content in the virtual space to the destination. Also, the control method according to an exemplary embodiment causes the terminal apparatus 1 to include determining whether or not the calculated route satisfies the predetermined condition related to the moving direction. Further, the control method according to an exemplary embodiment causes the terminal apparatus 1 to execute including controlling the display of the game content such that the game content moves to the predetermined position along the route when it may be determined that the route satisfies the predetermined condition. With such a configuration, the control method according to an exemplary embodiment can support the player's operation on the character.

In the above description, the calculating unit 142 may extract the destination in which the distance in the virtual space from the position of the game content may be a predetermined distance or less, but the invention may not be limited thereto, as may be described with respect to an exemplary embodiment. For example, the calculating unit 142 may extract the destination in which the route cost may be a predetermined value or less after calculating the routes from the position of the game content to all the destinations and the route costs in the route calculation graph. Also, when a value other than the link length is used as the cost of the link, the calculating unit 142 may extract a destination in which a total value of the lengths of the links included in the route may be a predetermined value or less.

The polygonal area may be associated with any one of a plurality of area groups. Then, the calculating unit 142 may extract the destination included in the polygonal area associated with the area group associated with the polygonal area including the position of the game content. In this case, the storage unit 11 may store identification information identifying the area group in the area table 1010 in association with each polygonal area. The calculating unit 142 may identify the polygonal area including the position of the game content, and then may retrieve identification information of the area group associated with the identified polygonal area with reference to the area table 1010. Then, the calculating unit 142 may retrieve the area ID 1011 of another polygonal area associated with the retrieved identification information of the area group. Then, the calculating unit 142 may extract the destination by retrieving the destination ID1021 of the destination associated with the retrieved area ID1023 with reference to the destination table 1020. Accordingly, it may be possible to flexibly set the destination to which the game content may be able to move automatically and the destination to which the game content may be unable to move automatically.

In the above description, the display control unit 144 may control the display of the game content such that the game content may stop when the game content moving along the route touches the obstacle object before reaching the destination, but the invention may not be limited thereto. For example, in an exemplary embodiment, the game content may not touch the obstacle object.

In this case, the storage unit 11 may store a plurality of polygonal areas obtained by dividing an area excluding an area of a predetermined range centered on the obstacle object from the movable area. Accordingly, the game contents moving along the route may be prevented from touching the obstacle object before reaching the destination.

Also, the game content may be set to touch or not to touch the obstacle object depending on a type of obstacle object. For example, the obstacle object may include an enemy game content in which a match game may be started when it touches the game content and a non-player character (NPC) in which an event may be started when it touches the game content. The storage unit 11 may store a plurality of polygonal areas obtained by dividing the area excluding the area of the predetermined range centered on the obstacle object which may be the NPC from the movable area. Accordingly, the game content moving along the route may touch the obstacle object, which may be the enemy game content, without touching the obstacle object, which may be the NPC, before reaching the destination. Further, the player can enjoy the match game with the enemy game content while omitting the event with the NPC by inputting the instructions for moving. The game content moving along the route may be set to be able to touch the obstacle object that may be the NPC without touching the obstacle object which may be the enemy game content. Accordingly, the player can enjoy the event with the NPC while omitting the match games.

In the above description, it may be determined that the route satisfies the predetermined condition when the size of the angle formed by the direction of the first element of the route connected to the position of the game content among the elements of the route constituting the route and the moving direction included in the instructions for moving is a predetermined angle or less, but the invention may not be limited thereto. It may be determined whether or not the predetermined condition is satisfied on the basis of whether or not a degree of divergence between the first element of the route and the instructions for moving input by the player is a predetermined value or less.

In this case, the retrieving unit 141 of the terminal apparatus 1 may retrieve instructions for moving including a series of retrieved input positions instead of the operation position and the moving direction. The determining unit 143 of the terminal apparatus 1 may calculate a distance between a line segment representing the first element of the route and the coordinates of each of a series of retrieved input positions. Then, the determining unit 143 may calculate the degree of divergence by averaging the calculated distances. Then, the determining unit 143 may determine whether or not the route satisfies the predetermined condition by determining whether or not the degree of divergence is a predetermined value or less. Accordingly, the game content may move first along the input positions included in the instructions for moving input by the player, and thus the operation more intuitive for the player may be realized.

The degree of divergence may be calculated by an arbitrary method without being limited to the above method. For example, the degree of divergence may be a total value of the distances between the line segment representing the first element of the route and the coordinates of a series of retrieved input positions. Further, the determining unit 143 may extract a predetermined number of distances having a small or large value among the distances between the line segment representing the element of the route connected to the position of the game content and the coordinates of a series of retrieved input positions and use an average value or a sum of these values as the degree of divergence.

Also, it may be determined whether or not the predetermined condition is satisfied on the basis of whether or not a degree of coincidence between the first element of the route and the instructions for moving input by the player is a predetermined value or more. The degree of coincidence may be, for example, an inner product of a vector corresponding to the first element of the route and a vector corresponding to the instructions for moving input by the player. The vector corresponding to the first element of the route may be, for example, a vector in which one of two end points of the first element of the route which may be the position of the game content is a start point, and the other end point is an end point. The vector corresponding to the instructions for moving input by the player may be, for example, a vector in which the final input position among the input positions included in the instructions for moving are an end point, and an immediately previously retrieved input position is a start point. The vector corresponding to the movement instruction may be a vector determined on the basis of other input positions.

Further, the determining unit 143 may determine only a route in which the degree of divergence between the first element of the route constituting the route among the calculated routes and the instructions for moving may be smallest or a route in which the degree of divergence between the first element of the route constituting the route and the instructions for moving may be largest as the route satisfying the predetermined condition.

In the above description, the moving direction included in the instructions for moving may be a direction of the (lastly retrieved) final input position with respect to the (immediately previously retrieved) penultimate input position, but the invention may not be limited thereto. For example, the moving direction may be the direction of the final input position with respect to the initially retrieved input position. The moving direction may be a straight direction calculated on the basis of a series of retrieved input positions. In this case, the calculated straight line may be, for example, a straight line in which a total value of the distances (or values based on the distance such as the square of the distance) from the coordinates of a series of retrieved input positions may be smallest.

Accordingly, even when the player performs an erroneous operation immediately before ending the touch on the operating unit 12, the possibility of the movement of the game content in a direction unintended by the player may be reduced, and an operation according to the player's intention may be realized.

In the above description, when it may be determined that a plurality of routes satisfy the predetermined condition related to the moving direction, the display control unit 144 may control the display of the game content such that the game content moves along the route with the smallest route cost, but the invention may not be limited thereto. For example, when there are a plurality of routes in which the angle formed by the first element of the route constituting the route and the moving direction is a predetermined angle or less, the display control unit 144 may control the display of the game content such that the game content moves along the route with the smallest angle size.

Accordingly, since the game content moves along the route in which the difference from the moving direction included in the instructions for moving may be smallest, and thus the operation more intuitive for the player may be realized.

Also, the determining unit 143 may determine a different predetermined angle for each route when determining whether or not the angle formed by the direction of the first element of the route constituting the route and the moving direction included in the instructions for moving is a predetermined angle or less. For example, the determining unit 143 may determine the predetermined angle such that the predetermined angle increases as the route cost increases. Further, the determining unit 143 may determine the predetermined angle such that the predetermined angle increases as the distance in the virtual space between the position of the game content and the destination reached via the route increases. Further, the determining unit 143 may determine the predetermined angle such that the predetermined angle increases as the length of the first element of the route increases.

When the player causes the game content to move to a distant destination, it may be difficult for the player to predict the shortest route, and thus the moving direction included in the instructions for moving may be likely to be different from the direction of the first element of the route. By configuring the determining unit 143 as described above, even when the game content may be moved to a distant destination, the size of the angle formed by the first element of the route and the moving direction may be likely to be a predetermined angle or less, and thus the player can easily cause the game content to move to a distant destination.

An exemplary embodiment may be provided by cooperation with a terminal apparatus and a server apparatus. In this case, the terminal apparatus 1 may include a communication unit and may be connected to be able to perform communication with the server apparatus. Further, some of the functions of the terminal apparatus 1 may be provided by the server apparatus. For example, the processing unit 14 of the terminal apparatus 1 may retrieve a signal corresponding to the instructions for moving given by the player and transmits it to the server apparatus via the communication unit. The server apparatus may generate display data for performing display such that the game content moves in accordance with the received instructions for moving and transmits it to the terminal apparatus 1. The processing unit 14 of the terminal apparatus 1 may control the display unit 13 such that the game content moves on the basis of the received display data. Accordingly, the game according to an exemplary embodiment can be provided regardless of processing capability of the terminal apparatus 1.

It should be understood that those skilled in the art can make various types of changes, substitutions, and modifications without departing from the spirit and scope of the invention. For example, the functions of the above respective units may be combined or divided appropriately within the spirit and scope of the invention. Further, the processes of the respective units described above may be performed in a different order. Further, the embodiment and the modified examples described above may be implemented in an appropriate combination.

The invention claimed is:

1. A terminal apparatus, comprising:
a display configured to display a game content positioned in a virtual space; an input interface configured to receive movement instructions for moving the game content, wherein the movement instructions include a moving direction given by a player; a storage memory configured to store information related to a predetermined position in the virtual space; and a processor communicatively coupled to the input interface and configured to retrieve the movement instructions, and further configured to:
  determine a current position of the game content relative to a geometry provided in the virtual space; calculate a route from the current position of the game content in the virtual space to the predetermined position comprising a plurality of route elements; determine whether or not the route calculated from the current position of the game content satisfies a predetermined condition related to the moving direction, wherein the predetermined condition is either:
  a condition that a size of an angle formed by the moving direction and a direction of a route element in the plurality of route elements connected to the current position of the game content is less than or equal to a predetermined angle, or
  a condition that a degree of coincidence is a predetermined value or more, wherein the degree of coincidence is an inner product of a vector corresponding to a first element of the route and a vector corresponding to the movement instructions input by the player; and
  after retrieving the movement instructions, and upon determination that the route satisfies the predetermined condition, initiate a process of moving the game content, based on the movement instructions, from a starting point defined at the current position toward an ending point defined at the predetermined position, wherein the process of moving the game content from the current position toward the predetermined position comprises one or more instances of:
  determining whether a manual operation instruction has been received after retrieving the movement instructions; and upon determination that no manual operation instruction has been received, performing automatic movement comprising generating display data for performing display of the game content whereby the game content is moved along the route; and after generating said display data, controlling display of the game content to initiate a visualization of the game content moving along the route in accordance with the generated display data.

2. The terminal apparatus according to claim 1, wherein the processor is configured to, upon receipt of the movement instructions the game content, retrieve a pre-calculated polygonal area from the storage memory.

3. The terminal apparatus according to claim 2, wherein the processor is further configured to:
  prior to retrieving the movement instructions the game content, retrieve a movable area of the virtual space, divide the movable area of the virtual space into a plurality of polygonal areas; store the plurality of polygonal areas in the storage memory; and retrieve the pre-calculated polygonal area from the plurality of polygonal areas stored in the storage memory.

4. The terminal apparatus according to claim 3, wherein the processor is configured to divide the movable area of the virtual space into the plurality of polygonal areas by:
  identifying a plurality of destinations in the movable area of the virtual space; and determining a plurality of polygonal areas, wherein each polygonal area in the plurality of polygonal areas includes including one destination in the plurality of destinations.

5. The terminal apparatus according to claim 1, wherein the processor is configured to generate a route calculation graph including a plurality of nodes by generating, in the plurality of nodes, a first node defined at the starting point and a plurality of nodes defined at a plurality of predetermined destinations, the plurality of nodes includes a second node defined at the predetermined position, and the plurality of route elements comprises line segments connecting nodes in the plurality of nodes.

6. The terminal apparatus according to claim 5, wherein the processor is configured to perform the process of moving the game content by determining a shortest route between the first node and the second node and passing through at least one intermediate node.

7. The terminal apparatus according to claim 1, wherein the processor is configured to, after calculating the route from the current position of the game content in the virtual space to the predetermined position, and after determining whether the manual operation instruction has been received, interrupt processing upon determination that the manual operation instruction has been received.

8. The terminal apparatus according to claim 7, wherein the processor is configured to: during the process of moving the game content, receive the manual operation instruction; and upon receipt of the manual operation instruction, interrupt display of the visualization of the game content moving along the route before the visualization is completed and before the game content is moved to the predetermined position.

9. The terminal apparatus according to claim 8, wherein the processor is further configured to, following interrupting of the display of the visualization of the game content moving to the predetermined position, initiate a new process of moving the game content based on the manual operation instruction.

10. The terminal apparatus according to claim 1, wherein the processor is further configured to: during the process of moving the game content, detect an interaction between the game content and at least one predetermined game content defined in the virtual space; and upon detecting the interaction between the game content and the at least one predetermined game content, interrupt display of the visualization of the game content moving to the predetermined position along the route before the visualization is completed and before the game content is moved to the predetermined position; and initiate processing based on the interaction.

11. The terminal apparatus according to claim 10, wherein the at least one predetermined game content is an enemy game content, and wherein the processor is configured to initiate processing based on the interaction by initiating a match game with the enemy game content.

12. The terminal apparatus according to claim 1, wherein the processor is further configured to:
  retrieve the movement instructions, including the moving direction given by the player, by retrieving information related to an operation position; and determine not to move the game content according to the movement instructions and not to calculate the route when the information related to the operation position retrieved by the processor-is within a predetermined range.

13. The terminal apparatus according to claim 1, wherein the processor is configured to control the display of the game content such that the game content moves in the moving direction when it is determined that the route does not satisfy the predetermined condition.

14. The terminal apparatus according to claim 1, wherein the processor is configured to display at least a part of the route in the virtual space when it is determined that the route satisfies the predetermined condition.

15. The terminal apparatus according to claim 1, wherein the processor is configured to display information for urging the player to input the movement instructions on the display when the game content moving along the route stops before reaching the predetermined position.

16. The terminal apparatus according to claim 1, further comprising, an operating unit configured to detect a touch by the player, wherein the processor is configured to retrieve a touch position at which the player touches the operating unit at predetermined time intervals, and the moving direction is a direction between a penultimate touch position in a sequence retrieved by the processor, and a final touch position occurring at a final part of the sequence.

17. The terminal apparatus according to claim 1, wherein the processor is configured to calculate the route to the predetermined position in which a relation with the position of the game content is a predetermined relation.

18. A control method of a terminal apparatus including a storage memory, an input interface, a processor communicatively coupled to the input interface and a display, comprising:
  displaying, with the display, a game content positioned in a virtual space; storing information related to a predetermined position in the virtual space in the storage memory;
  retrieving, via the input interface, movement instructions, wherein the movement instructions include a moving direction given by a player; determining a current position of the game content relative to a geometry provided in the virtual space; calculating a route from the current position of the game content in the virtual space to the predetermined position comprising a plurality of route elements; determining whether or not the route calculated from the current position of the game content satisfies a predetermined condition related to the moving direction, wherein the predetermined condition is either:
  a condition that a size of an angle formed by the moving direction and a direction of a route element in the plurality of route elements connected to the current position of the game content is less than or equal to a predetermined angle, or
  a condition that a degree of coincidence is a predetermined value or more, wherein the degree of coincidence is an inner product of a vector corresponding to a first element of the route and a vector corresponding to the movement instructions input by the player; and
  after retrieving the movement instructions, and upon determination that the route satisfies the predetermined condition, initiating a process of moving the game content, based on the movement instructions, from a starting point defined at the current position toward an ending point defined at the predetermined position, wherein the process of moving the game content from the current position toward the predetermined position comprises one or more instances of:
  determining that no manual operation instruction has been received after retrieving the movement instructions; and upon determination that no manual operation instruction has been received, generating display data for performing display of the game content whereby the game content is moved to an end of a route element in the plurality of route elements, and, after generating said display data, controlling display of the game content to initiate a visualization of the game content moving to the end of the route element in the plurality of route elements along the route in accordance with the generated display data.

19. A non-transitory computer-readable medium comprising program code, that, when executed by a terminal apparatus including a storage memory, an input interface, a processor communicatively coupled to the input interface and a display, is configured to configure the terminal apparatus to perform steps of:
  displaying, with the display, a game content positioned in a virtual space; storing information related to a predetermined position in the virtual space in the storage memory; retrieving, via the input interface, movement instructions, wherein the movement instructions include a moving direction given by a player; determining a current position of the game content relative to a geometry provided in the virtual space, and calculating a route from the current position of the game content in the virtual space to the predetermined position comprising a plurality of route elements; determining whether or not the route calculated from the current position of the game content satisfies a predetermined condition related to the moving direction, wherein the predetermined condition is either:
  a condition that a size of an angle formed by the moving direction and a direction of a route element in the plurality of route elements connected to the current position of the game content is less than or equal to a predetermined angle, or
  a condition that a degree of coincidence is a predetermined value or more, wherein the degree of coincidence is an inner product of a vector corresponding to a first element of the route and a vector corresponding to the movement instructions input by the player; and
  after retrieving the movement instructions, and upon determination that the route satisfies the predetermined condition, initiating a process of moving the game content, based on the movement instructions, from a starting point defined at the current position toward an ending point defined at the predetermined position, wherein the process of moving the game content from the current position toward the predetermined position comprises one or more instances of:
  determining whether a manual operation instruction has been received after retrieving the movement instructions; and upon determination that no manual operation instruction has been received, generating display data for performing display of the game content whereby the game content is moved to an end of a route element in the plurality of route elements, and, after generating said display data, controlling display of the game content to initiate a visualization of the game content moving to the end of the route element in the plurality of route elements along the route in accordance with the generated display data.

* * * * *